(12) United States Patent
Taylor et al.

(10) Patent No.: US 7,347,660 B2
(45) Date of Patent: *Mar. 25, 2008

(54) CROSS-FLOW WIND TURBINE

(75) Inventors: Scott J. Taylor, Cheyenne, WY (US); Ronald Taylor, Cheyenne, WY (US); Brad C. Cochran, Fort Collins, CO (US); David Banks, Fort Collins, CO (US)

(73) Assignee: Terra Moya Aqua, Inc., Cheyenne, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/685,365

(22) Filed: Mar. 13, 2007

(65) Prior Publication Data

US 2007/0154299 A1    Jul. 5, 2007

Related U.S. Application Data

(63) Continuation of application No. 11/284,774, filed on Nov. 21, 2005, now Pat. No. 7,189,050, which is a continuation-in-part of application No. 10/831,515, filed on Apr. 23, 2004, now Pat. No. 6,966,747.

(60) Provisional application No. 60/467,773, filed on Apr. 30, 2003, provisional application No. 60/639,448, filed on Dec. 23, 2004.

(51) Int. Cl.
*F03D 3/04* (2006.01)

(52) U.S. Cl. .................... 415/1; 415/186; 415/191; 415/907; 415/197 A

(58) Field of Classification Search .................. 415/1, 415/4.2, 4.4, 151, 152.1, 159, 165, 185, 186, 415/191, 907; 290/44, 55
See application file for complete search history.

(56) References Cited

U.S. PATENT DOCUMENTS

| | | |
|---|---|---|
| 201,400 A | 3/1878 | Everhart |
| 2,812,823 A | 11/1957 | Oviedo |

(Continued)

OTHER PUBLICATIONS

James Torginon, A Windcharger For the Attic, Mechanix Illustrated, Mar. 1876.

*Primary Examiner*—Ninh H. Nguyen
(74) *Attorney, Agent, or Firm*—William W. Cochran; Cochran Freund & Young LLC

(57) ABSTRACT

Disclosed are various embodiments of cross-wind turbines that are capable of providing high efficiencies over a wide range of wind velocities. An airfoil stator causes wind to accelerate along its surface and creates a low pressure area on the leading face of the rotor blade during the power stroke. A blocking stator blocks wind from impeding the movement of the rotor blades during the return cycle and directs wind onto the trailing face of the rotor blades during the power cycle. A large pressure differential is created between the leading face of the rotor blade and the trailing face of the rotor blade during the power cycle which creates a large amount of force that rotates the rotor blade about the central shaft. In some embodiments, gaps are provided between the inside edge of the rotor blade and a stationary shaft which vents wind collected by the rotor blade during certain portions of the rotation cycle. The vented wind increases the pressure on the trailing face of the rotor blades during the return cycle to further assist in the efficiency of this system.

10 Claims, 40 Drawing Sheets

U.S. PATENT DOCUMENTS

| | | |
|---|---|---|
| 2,896,882 A | 7/1959 | Nelson |
| 3,876,925 A | 4/1975 | Stoeckert |
| 3,895,882 A | 7/1975 | Moyer |
| 3,922,012 A | 11/1975 | Herz |
| 3,938,907 A | 2/1976 | Magoveny et al. |
| 3,986,786 A | 10/1976 | Sellman |
| 4,031,405 A | 6/1977 | Asperger |
| 4,037,983 A | 7/1977 | Poeta |
| 4,047,833 A | 9/1977 | Decker |
| 4,057,270 A | 11/1977 | Lebost |
| 4,070,131 A | 1/1978 | Yen |
| 4,079,264 A | 3/1978 | Cohen |
| 4,084,918 A | 4/1978 | Pavlecka |
| 4,088,419 A | 5/1978 | Hope et al. |
| 4,115,027 A | 9/1978 | Thomas |
| 4,115,028 A | 9/1978 | Hintze |
| 4,116,581 A | 9/1978 | Bolie |
| 4,119,863 A | 10/1978 | Kelly |
| 4,132,282 A | 1/1979 | Sparks |
| 4,154,556 A | 5/1979 | Webster |
| 4,156,580 A | 5/1979 | Pohl |
| 4,164,382 A | 8/1979 | Mysels |
| 4,174,923 A | 11/1979 | Williamson |
| 4,204,796 A | 5/1980 | Pack |
| 4,234,289 A | 11/1980 | Lebost |
| 4,236,866 A | 12/1980 | Zapata Martinez |
| 4,260,325 A | 4/1981 | Cymara |
| 4,270,056 A | 5/1981 | Wright |
| 4,278,896 A | 7/1981 | McFarland |
| 4,288,200 A | 9/1981 | O'Hare |
| 4,295,783 A | 10/1981 | Lebost |
| 4,309,146 A | 1/1982 | Hein et al. |
| 4,350,900 A * | 9/1982 | Baughman .................. 290/55 |
| 4,365,929 A | 12/1982 | Retz |
| 4,423,368 A | 12/1983 | Bussiere |
| 4,452,562 A | 6/1984 | Hsu |
| 4,457,666 A | 7/1984 | Selman, Jr. |
| 4,474,529 A | 10/1984 | Kinsey |
| 4,486,143 A | 12/1984 | McVey |
| 4,490,232 A | 12/1984 | Lapeyre |
| 4,496,848 A | 1/1985 | Binder |
| 4,551,631 A | 11/1985 | Trigilio |
| 4,575,311 A | 3/1986 | Wood |
| 4,606,697 A | 8/1986 | Appel |
| 4,717,832 A | 1/1988 | Harris |
| 4,830,570 A | 5/1989 | Benesh |
| 4,838,757 A | 6/1989 | Benesh |
| 4,843,249 A | 6/1989 | Bussiere |
| 4,890,976 A | 1/1990 | Jensson |
| 4,960,363 A | 10/1990 | Bergstein |
| 4,979,871 A | 12/1990 | Reiner |
| 5,020,967 A | 6/1991 | Gual et al. |
| 5,037,268 A | 8/1991 | Fenlon |
| 5,038,049 A | 8/1991 | Kato |
| 5,126,584 A | 6/1992 | Ouellet |
| 5,133,637 A | 7/1992 | Wadsworth |
| 5,163,813 A | 11/1992 | Schlenker |
| 5,203,672 A | 4/1993 | Wolf |
| 5,246,342 A | 9/1993 | Bergstein |
| 5,269,647 A | 12/1993 | Moser |
| 5,280,827 A | 1/1994 | Taylor |
| 5,287,004 A | 2/1994 | Finley |
| 5,313,103 A | 5/1994 | Hickey |
| 5,333,996 A | 8/1994 | Bergstein |
| 5,336,933 A | 8/1994 | Ernster |
| 5,380,149 A | 1/1995 | Valsamidis |
| 5,386,146 A | 1/1995 | Hickey |
| 5,391,926 A | 2/1995 | Staley et al. |
| 5,454,694 A | 10/1995 | O'Dell |
| 5,463,257 A | 10/1995 | Yea |
| 5,503,525 A | 4/1996 | Brown et al. |
| 5,553,996 A | 9/1996 | Farrar |
| 5,844,324 A | 12/1998 | Spriggle |
| 5,852,331 A | 12/1998 | Giorgini |
| 5,895,201 A | 4/1999 | Huovinen |
| 6,000,907 A | 12/1999 | Bic |
| 6,015,258 A | 1/2000 | Taylor |
| 6,083,382 A | 7/2000 | Bird |
| 6,109,863 A | 8/2000 | Milliken |
| 6,113,350 A | 9/2000 | Liu |
| 6,138,781 A | 10/2000 | Hakala |
| 6,158,953 A | 12/2000 | Lamont |
| 6,191,496 B1 | 2/2001 | Elder |
| 6,309,172 B1 | 10/2001 | Gual |
| 6,406,251 B1 | 6/2002 | Vauthier |
| 6,448,669 B1 | 9/2002 | Elder |
| 6,538,340 B2 | 3/2003 | Elder |
| 2002/0192069 A1 | 12/2002 | Newman |
| 2003/0026684 A1 | 2/2003 | Bohn |

\* cited by examiner

|  | 10 KW | 1000 KW |
|---|---|---|
| ROTOR | ÿ12' X 24' | ÿ90' X 210' |
| LENGTH STATOR 102 | 15'-5" | 115'-7 1/2" |
| LENGTH STATOR 104 | 12' | 90' |
| LENGTH STATOR 106 | 12' | 90' |
| GAP 124 | 16-1/2" | TBD |
| GAP 126 | 18" | TBD |
| GAP 128 | 27-3/4" | TBD |
| TOTAL HEIGHT | 33' | 230' |

FIG. 1B

CROSS-FLOW WIND TURBINE

CROSS REFERENCE TO RELATED APPLICATIONS

This application is a continuation of U.S. patent application Ser. No. 11/284,774, entitled "Cross-Flow Wind Turbine," filed Nov. 21, 2005 now U.S. Pat. No. 7,189,050, which is a continuation-in-part of U.S. patent application Ser. No. 10/831,515 entitled "Wind Turbine Having Airfoils for Blocking and Directing Wind and Rotors With or Without a Central Gap" by Ronald Taylor and Scott Taylor, filed Apr. 23, 2004 now U.S. Pat. No. 6,966,747, which claims the benefit of and priority to U.S. Provisional Patent Application Ser. No. 60/467,773 entitled "Wind Turbine" by Ronald Taylor and Scott Taylor, filed Apr. 30, 2003. U.S. patent application Ser. No. 11/284,774 further claims the benefit of U.S. Provisional Patent Application Ser. No. 60/639,448, filed on Dec. 23, 2004, entitled "Cross-Flow Wind Turbine." The entire contents of the above mentioned applications are hereby specifically incorporated herein by reference for all they disclose and teach.

BACKGROUND OF THE INVENTION

Wind turbines have provided a valuable source of alternative energy. Constant improvements in wind turbine systems have been made over the past few years. Most of the wind turbine systems in use today are axial-flow systems that are otherwise known as propeller systems. In axial-flow wind turbine systems, air travels in a direction that is substantially parallel to the rotating axis of the wind turbine. The large propeller blades are driven by the wind at a rotational speed that creates tip speeds of the blade that can range from approximately six to nine times the speed of the wind. Tip speeds of over several hundred miles an hour can be achieved in moderately strong to strong winds which will cause axial-flow wind turbines to break apart. Hence, expensive braking systems and systems for feathering the angle of the blades must be used to control the speed of axial-flow wind turbines in moderately strong to strong winds. As a result, axial-flow wind turbines are inefficient in moderately strong to strong winds and, as such, are unable to extract power from wind energy when it is at its greatest energy producing level. In effect, axial-flow wind turbines are designed for use in light to moderate winds.

Further, axial-flow wind turbines are very dangerous to birds. Birds are frequently killed by the inability of these avians to sense the presence of the rapidly moving blades of the axial-flow wind turbines.

Cross-flow wind turbines constitute a different class of wind turbines. See U.S. patent application Ser. No. 10/831,515, entitled "Wind Turbine Having Airfoils for Blocking and Directing Wind and Rotors With or Without a Central Gap," filed Apr. 23, 2004, and U.S. Pat. No. 6,015,258, entitled "Wind Turbine," issued Jan. 18, 2000, the entire contents of which is hereby incorporated herein by reference for all it discloses and teaches. In cross-flow wind turbines, the wind flows across the rotors in a direction that is substantially normal to the axis of the rotating shaft. Cross-flow wind turbines have certain advantages over axial-flow wind turbines, but have not previously been seriously considered as a source of alternative energy because of the comparatively lower efficiencies with respect to the axial-flow wind turbines. An advantage of the cross-flow wind turbine is that the tip speed of the rotors of the cross-flow wind turbines move at a maximum speed that is only slightly greater than the speed of the wind. As such, cross-flow turbines can operate equally as well in both low and high wind conditions. In addition, the cross-flow wind turbine is easily seen by birds resulting in no avian deaths. Cross-flow wind turbines are also much quieter than the axial-flow wind turbines, primarily because the cross-flow wind turbines do not move at a high rate of speed and do not create a substantial amount of turbulence.

SUMMARY OF THE INVENTION

An embodiment of the present invention may therefore comprise a method of capturing wind energy using a cross-flow wind turbine comprising: generating a low pressure area on a leading face of a rotor blade by accelerating the flow of air across the surface of an airfoil stator that is positioned to form a predetermined gap between the rotor blade and the air foil stator during a power stroke of the rotor blade; using a blocking stator to substantially block wind from impeding movement of the rotor blade during a return cycle of the rotor blade and directing the substantially blocked wind to a trailing face of the rotor during the power stroke of the rotor blade so as to create a pressure differential between the leading face and the rotor blade and the trailing face of the rotor blade during the power stroke that creates a force that rotates the rotor blade.

An embodiment of the present invention may further comprise a cross-flow wind turbine system that is capable of capturing wind energy comprising: a rotor having at least two semicircular shaped rotor blades; an airfoil stator positioned to capture and accelerate wind across an airfoil surface of the airfoil stator and provide a gap having a predetermined size between the rotor blades and the airfoil surface so that a negative pressure area is formed on a leading face of the rotor blades as the rotor blades pass by the airfoil surface during a power stroke; and a blocking stator positioned to substantially block wind from impeding upon the leading face of the rotor blades during a return stroke and direct wind that is blocked by the blocking stator onto a trailing face of the rotor blades during the power stroke such that a pressure differential is created between the leading face of the rotor blades and the trailing face of the rotor blades during the power stroke that creates a force that rotates the rotor blade.

An embodiment of the present invention may further comprise a cross-flow wind turbine that generates mechanical energy from wind comprising: a rotor having a plurality of rotor blades that are substantially symmetrically disposed around a rotor; a rotor space formed in a volume that is swept out by the rotor blades, the rotor space having a drive portion in which the rotor blades are driven by the wind and a return portion in which the rotor blades return to the drive portion; a plurality of stators that direct wind into the drive portion and direct wind away from the return portion to cause the rotor to turn and generate the mechanical energy, the stators being placed around the rotor to provide a substantially bidirectional cross-flow turbine.

An embodiment of the present invention may further comprise a method of generating mechanical energy from wind comprising: providing a cross-flow wind turbine having stators and a rotor that sweeps out a rotor space, the rotor space having a drive portion and a return portion; placing a plurality of rotor blades substantially symmetrically around the rotor; placing the stators around the rotor in locations that substantially direct the wind into the drive portion of the rotor space so that the wind drives the rotor blades in the drive portion, and substantially block the wind from entering the return portion of the rotor space so that the rotor blades return to the drive portion to generate the mechanical energy.

An embodiment of the present invention may further comprise a method of capturing wind energy using a cross-flow wind turbine comprising: providing an airfoil stator that is positioned to capture and accelerate wind across an airfoil surface of said airfoil stator; generating a low pressure area on a leading face of a rotor blade by positioning the airfoil stator to form a predetermined gap between the rotor blade and the airfoil stator, the low pressure area generating a force on the leading face of the rotor blade that rotates the rotor blade in an efficient manner.

An embodiment of the present invention may further comprise a cross-flow wind turbine system that is capable of capturing wind energy comprising: a rotor having at least two semicircular shaped rotor blades; an airfoil stator positioned to capture and accelerate wind across an airfoil surface of the airfoil stator and provide a gap having a predetermined size between the rotor blades and the airfoil surface so that a negative pressure area is formed on a leading face of the rotor blades as the rotor blades pass by the airfoil surface that creates a force that rotates the rotor blades.

BRIEF DESCRIPTION OF THE DRAWINGS

In the drawings,

FIG. 1B provides typical dimensions of the embodiment of FIG. 1A.

DETAILED DESCRIPTION OF THE INVENTION

Figure 1A:
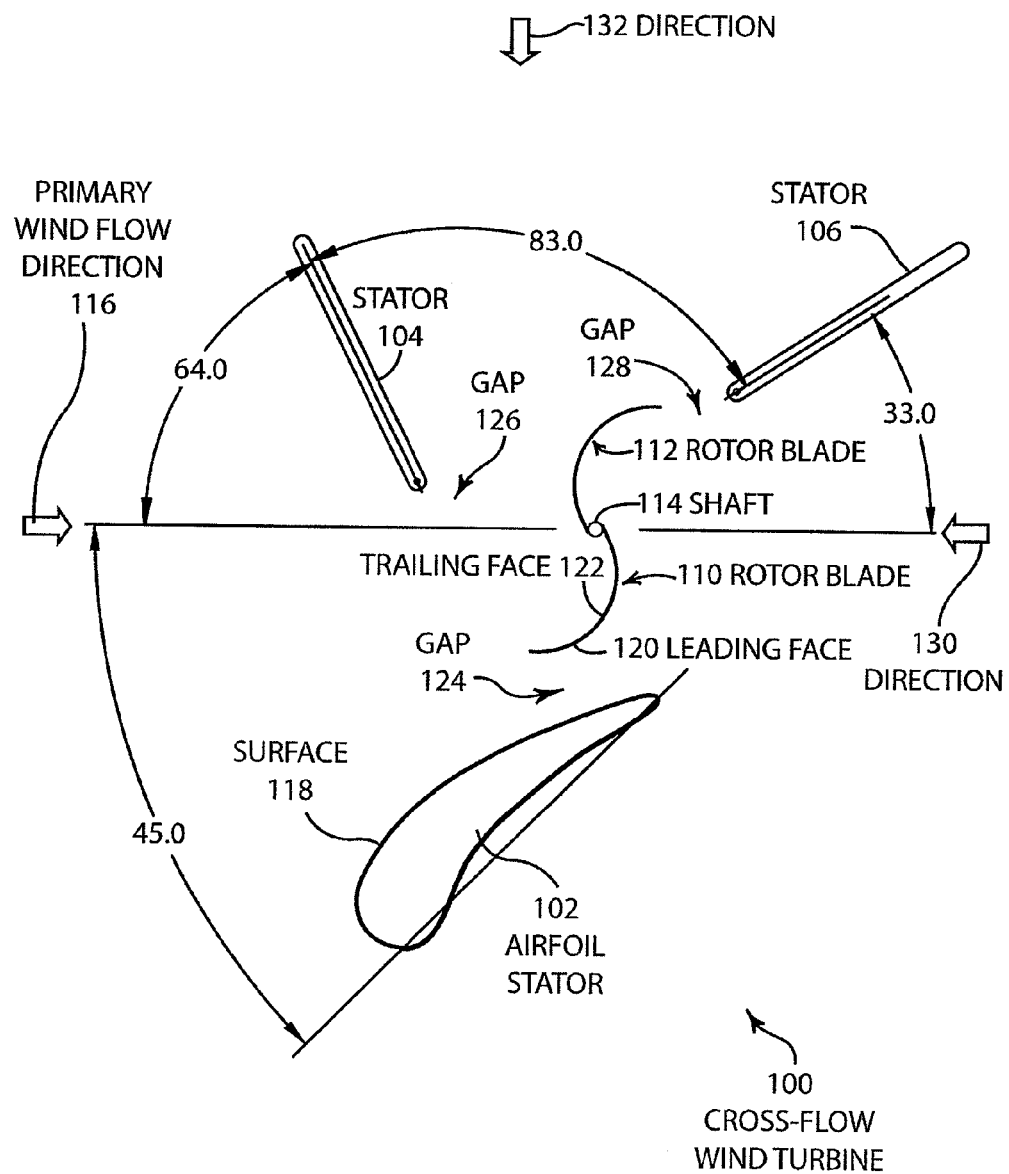
FIG. 1A is a top schematic view of one embodiment of the invention.

FIG. 1A is an illustration of one embodiment of a cross-flow wind turbine 100. The cross-flow wind turbine includes an air foil stator 102 that is fixed, stator 104 that is fixed and stator 106 that is also fixed. The rotor 108 rotates in response to forces created by wind. Rotor 108 includes rotor blade 110, rotor blade 112 and a rotating shaft 114. The cross-flow wind turbine 100, illustrated in FIG. 1A, is designed for maximum efficiency for wind flowing in a primary direction 116 which may be aligned with the prevailing wind at a specific geographical location. However, the cross wind flow turbine 100 also produces high efficiencies for winds flowing from other directions, as described in more detail below with respect to FIG. 3.

As also shown in FIG. 1A, the angular positions of the stators are shown with respect to the primary wind flow direction 116. The cross-flow wind turbine 100 that is illustrated in FIG. 1A shows each of the elements generally in their relative proportional sizes with respect to each other. It is believed that scaling of the cross-flow wind turbine 100 will not change the relative proportional sizes of the various elements or their location with respect to each other. It is anticipated that as the cross-flow wind turbine 100 is scaled to larger sizes that Reynolds numbers and differences in flow characteristics on larger scales will result in higher efficiencies as compared to wind tunnel testing of the cross-flow wind turbine 100. Rotor blade 110 and rotor blade 112 are attached to the shaft 114 so that as the rotor blades 110, 112 are moved by the wind, shaft 114 rotates. Rotor blades 110, 112, as illustrated in FIG. 1A, have shapes that are circular arcs of 120°. Empirical data gathered from both wind tunnel testing and computational fluid dynamics indicate that the 120° circular arc shape of rotor blades provides the highest efficiency.

The air foil stator 102 that is shown in FIG. 1A has a cambered profile that acts like an airplane wing so that air flowing across surface 118 of air foil stator 102 is accelerated. The accelerated flow of air across surface 118 creates a low pressure region on the leading face 120 of rotor blade 110 which helps to pull the rotor blade 110 through its power stroke. Because the wind flowing in the primary wind flow direction 116 is pushing on the trailing face 122 of rotor blade 110, a large pressure differential exists between the trailing face 122 and the leading face 120 of rotor blade 110. This large pressure differential assists the rotor blade 110 in moving in a counterclockwise direction around the shaft 114. The pressure gradients created are disclosed in more detail in FIG. 4A. Stator 104 is positioned to block wind, flowing from the primary wind flow direction 116, from impinging upon the leading face of the rotor blades during the return cycle, which is illustrated by the position of the rotor blade 112 in FIG. 1A. Stator 104 not only blocks wind from hitting the rotor blades during the return cycle, but also redirects the wind flowing from direction 116 to impinge upon the trailing face 122 of the rotor blade 110.

Stator 106 of FIG. 1A functions to guide the air flow on the downwind side of the rotor 108 away from the cross-flow wind turbine 100. Stator 106 also provides a third leg of a tripod structure to add structural rigidity to the system. Stator 106 also can perform other valuable functions. Wind flow studies for many geographical locations have provided data that the prevailing wind flows from a predominant direction during the windy season, which may, for example, be Winter season at many geographical sites. During the opposite season (off-season), such as Summer, the wind typically comes from a substantially opposite direction. Although the wind flow in the off-season may be only a fraction of the wind flow from the primary season, it still may be advantageous to capture the off-season wind with some degree of efficiency and convert it to mechanical energy. As can be seen from FIG. 1A, stator 106 can assist in redirecting wind into rotor blade 112 when the wind is from a direction 130 that is opposite to the primary wind flow direction 116. In that regard, it may also be desirable in some embodiments to provide camber to the stator 106 so that it creates an air foil, in a manner similar to the air flow stator 102. However, the primary purpose of the stator 106 is to provide structural rigidity and to assist the flow of wind in exiting the turbine without creating back pressure that would impede the performance of the cross-flow wind turbine 100.

Of course, to provide structural rigidity, stator 106 could be replaced with simply a structural member. Depending on the wind studies of a particular area, replacement of stator 106 with a structural member may make sense if the wind flow direction is almost exclusively from direction 116. Wind flow from direction 132 would allow stator 106 to function in a manner similar to stator 104, i.e., stator 106 would block wind from direction 132 during the return cycle of the rotor blades and redirect the wind to the trailing face of the rotor blades during the power stroke. Hence, if off-season wind comes from direction 132, as shown in FIG. 1A, stator 106 may provide advantageous properties for the cross-flow wind turbine 100.

Collected wind data from wind studies at a large majority of geographical sites have shown that a very large percentage (up to 90% or more) of the wind comes from the same quadrant as the prevailing wind direction. These studies have also shown that winds during the off-season are usually from the opposite quadrant, as indicated above. For example, if the primary wind flow direction 116 is the primary wind direction during the windy season, wind typically flows from direction 130 during the off season, at most geographical sites. However, the off-season winds carry only a fraction of the energy that is available from the winds in the primary wind flow direction in most geographical sites. Hence, the system of FIG. 1A is optimized for wind coming from the quadrant of the prevailing wind such that the primary flow direction 116 is aligned with the prevailing wind flow direction when the cross-flow wind turbine is installed at a site. As discussed in more detail with respect to FIG. 3, the system shown in FIG. 1A is an omni-directional system which has optimized efficiencies for a primary wind flow direction 116 and reduced efficiencies when the wind flows from a direction other than the primary wind flow direction 116. Again, however, the largest overall efficiency and the best return on investment comes from optimization of a system that captures wind from the prevailing wind direction for most geographical sites.

Figure 2:
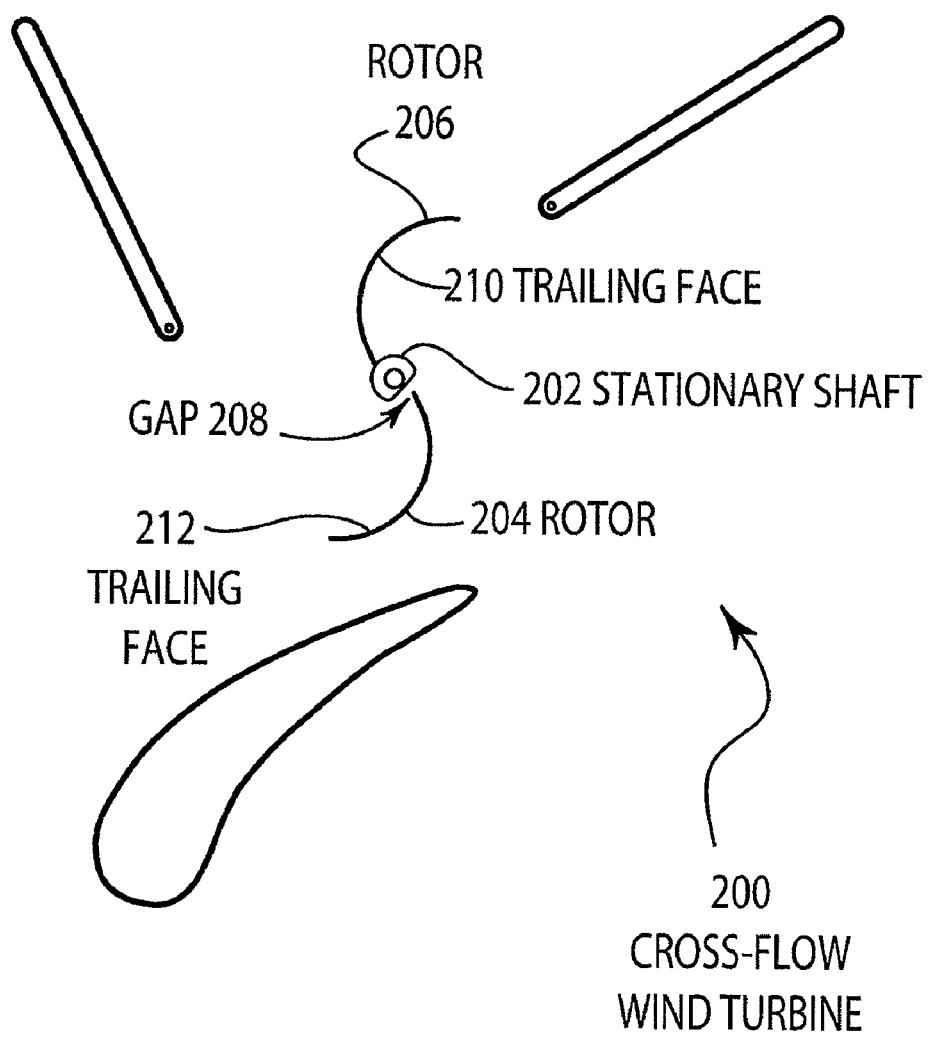
FIG. 2 is a schematic illustration of another embodiment of the invention.

The embodiment of FIG. 1A has produced the highest efficiencies of the various embodiments disclosed herein for wind tunnel testing. Computer simulations using computational fluid dynamics have shown that the embodiment of FIG. 2 provides the highest efficiencies. Empirical data collected from live testing of full scale systems will provide the best data as to which embodiment provides the highest efficiencies.

FIG. 1B provides a list of dimensions for both a 10 kilowatt cross-flow wind turbine having a total height of 33 feet and 1000 kilowatt turbine having a total height of 230 feet for the embodiment of FIG. 1A. Again, it is believed that the dimensions of these devices scale linearly with size.

FIG. 2 illustrates another embodiment 200 of a cross-flow wind turbine. The embodiment of FIG. 2 utilizes a stationary shaft 202. The shaft 202 remains stationary as the rotor blades 204, 206 rotate around the shaft 202. As can be seen from FIG. 2, stationary shaft 202 has a recessed portion which causes a gap 208 to form between the end of the rotor blade 206 adjacent to the shaft and the recessed portion of the shaft. Hence, a gap opens up between the inside end of the rotor and the shaft during certain portions of the cycle which causes deventing of the wind captured by the rotor blades during the power stroke. The wind that is vented through the gap 208 is directed towards rotor blade 206 to assist rotor blade 206 in moving through the return cycle. This is disclosed in more detail below. In other words, wind captured by the trailing face 212 of the rotor blade 204 is directed through the gap 208 and flows onto the trailing face 210 of the rotor blade 206 to create positive pressure on the trailing face 210.

Figure 3:
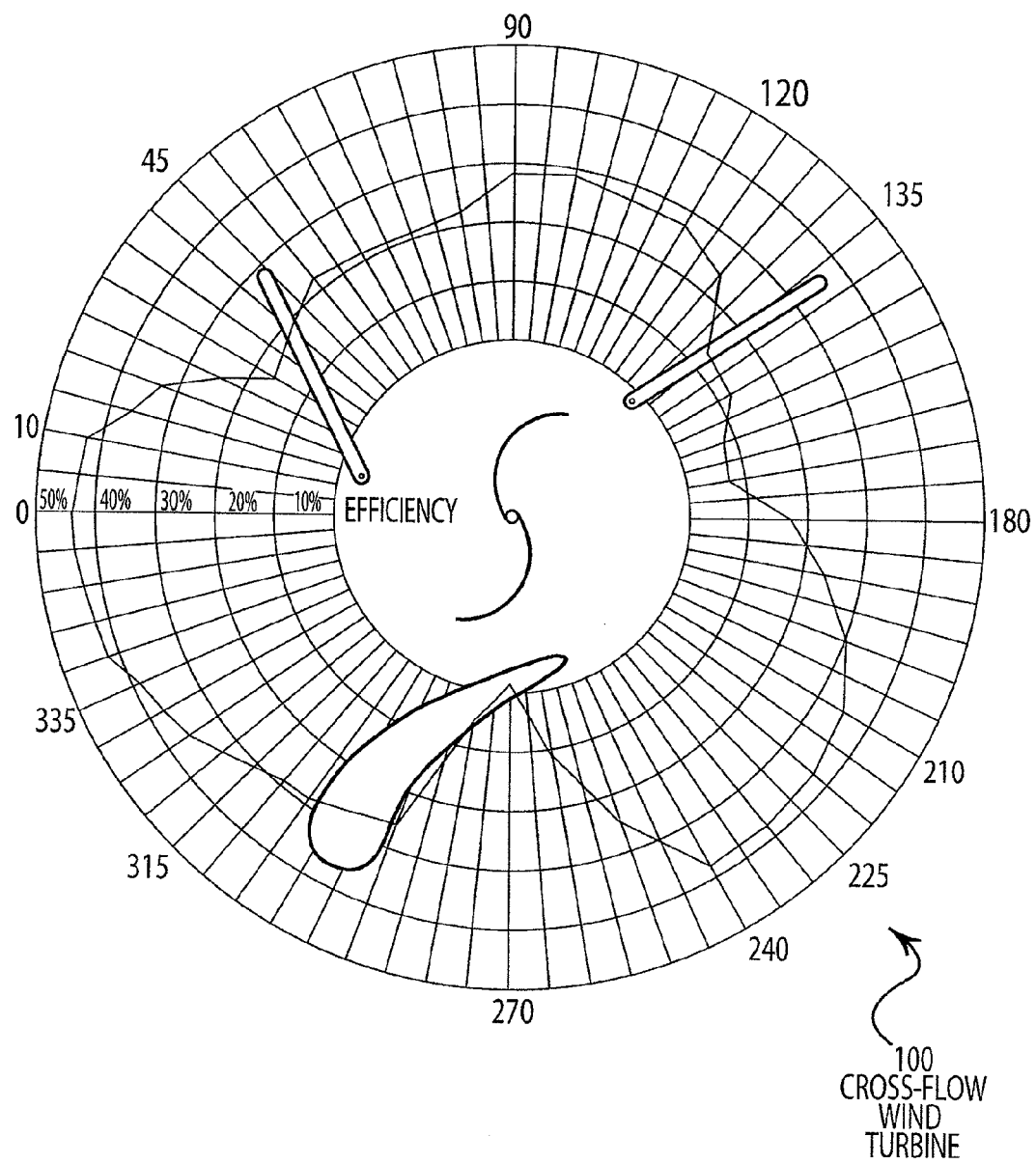
FIG. 3 is an efficiency graph illustrating efficiencies of the embodiment of FIG. 1A based on wind direction.

FIG. 3 is a graph illustrating efficiencies of the cross-flow wind turbine 100 that is illustrated in FIG. 1A, versus the direction of wind flow. As can be seen from FIG. 3, the highest efficiencies are obtained from wind flowing from directions of approximately 10° to 335°. In these directions, efficiencies of 40% to 45% are achieved. When the wind flows from the directions of approximately 210° to 240°, efficiencies range from 35% to 37%. In addition, reasonable efficiencies can be obtained in the range of 27% to 29% when the wind flows from the direction of 90° to 120°. Hence, the cross-flow wind turbine 100 illustrated in FIG. 3 is somewhat omni-directional, but clearly achieves the highest efficiencies of over 40% between 10° and 335°.

Figure 4A:
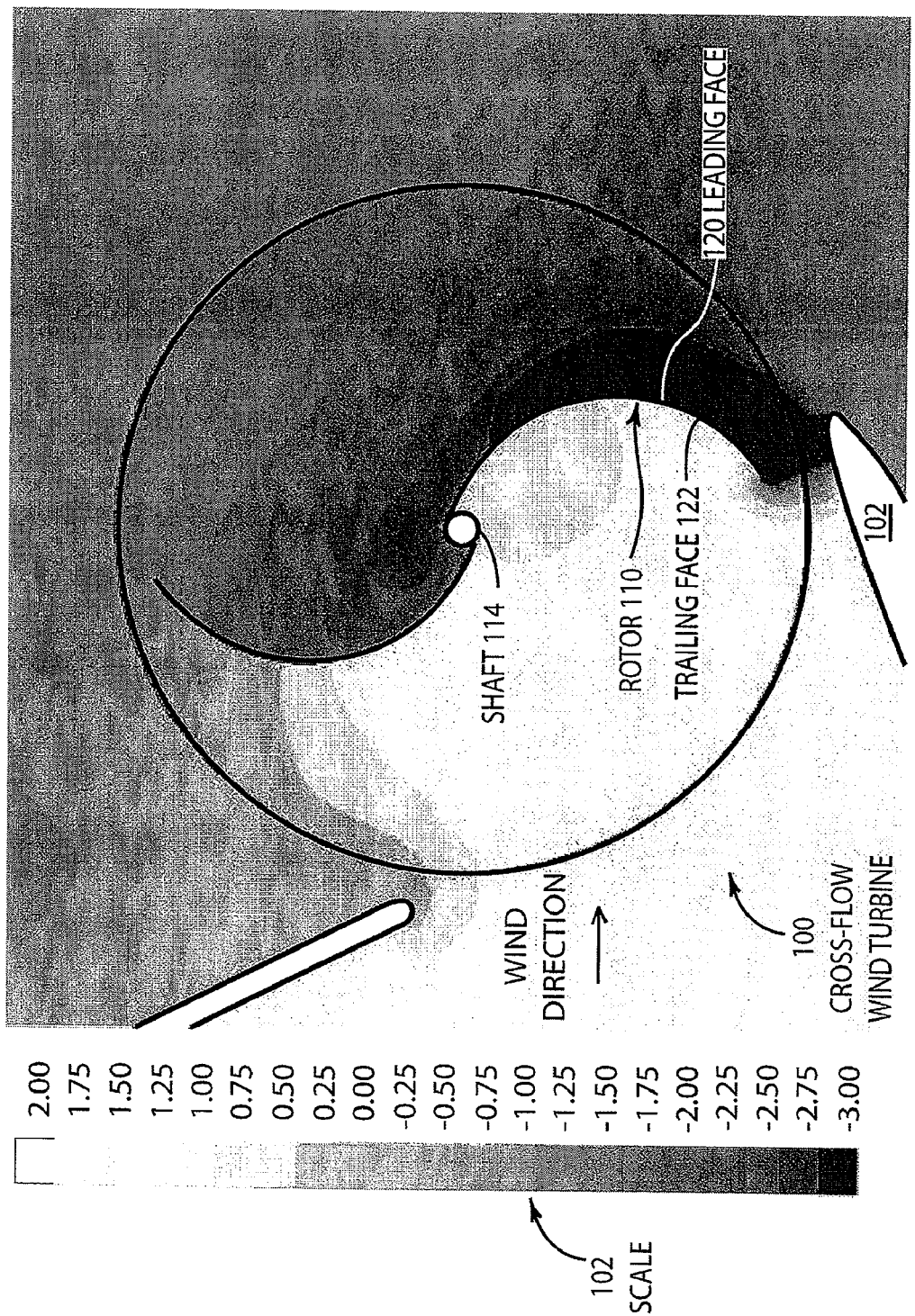
FIG. 4A is an illustration of pressure gradients that are produced by the embodiment of FIG. 1A as calculated from computer simulations using computational fluid dynamics.

FIG. 4A illustrates pressure gradients calculated by computer simulations using computational fluid dynamics for cross-flow wind turbine 100. The scale 102 shows positive pressures as lighter shades and negative pressures as darker shades. As can be seen from FIG. 4A, large negative pressures are created on the leading face 120 of rotor blade 110 as rotor blade 110 passes by air foil stator 102 during the power stroke. The large negative pressures created on the leading face 120 of rotor blade 110 result from the accelerated air flow across the surface of air foil stator 102. These negative pressures function to pull the rotor blade 110 in a counterclockwise direction around the shaft. Positive pressure indicated by lighter shades is created on the trailing face 122 of the rotor blade 110. The large differential in pressure created between the trailing face 122 and the leading face 120 of the rotor blade 110 creates a large amount of force on rotor blade 110 to cause the rotor blade 110 to rotate in a counterclockwise direction around the shaft 114. This large amount of force created during the power stroke of the cross-flow wind turbine 100 results in higher efficiencies.

Figure 4B:
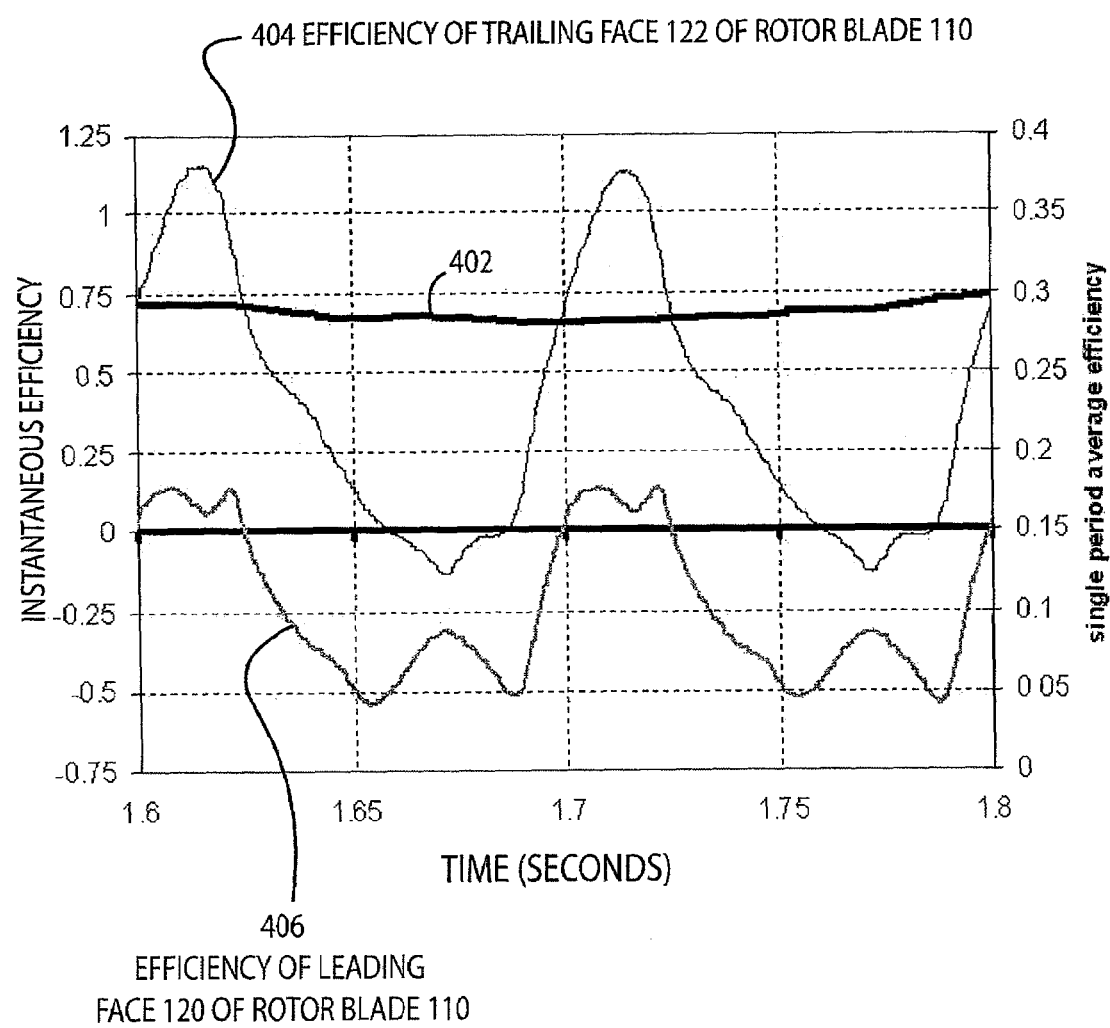
FIG. 4B is an efficiency graph of the embodiment of FIG. 4A.

FIG. 4B is an illustration of instantaneous efficiency and average efficiency of a single rotor blade versus time for the embodiment of FIG. 1A. As can be seen from FIG. 4B, the average efficiency illustrated by plot 402 ranges between 28% and 32%. The plot 404 is the instantaneous calculated efficiency for the leading face 120 of rotor blade 110 of the embodiment illustrated in FIG. 1A.

The efficiency graphs, such as graph 4B are calculated from computational fluid dynamics simulations on a computer. In the computational fluid dynamics simulations, the blades complete a full rotation every second. The dynamic loads on the blades are shown for one half revolution. A half second window shows all of the cyclical force patterns as the patterns repeat over the next half revolution with the forces on the blades reversed. Non-dimensional pressure coefficients are measured at each time step as the blades rotate through this half cycle. The pressure on the blades is a function of the pressure coefficient and the reference flow head, $$P = C_p \times q_{ref},$$

where $q_{ref}$ is the reference flow head.

$$q_{ref} = \frac{1}{2} p (U_{ref})^2$$

where p=air density $U_{ref}$=upstream velocity measured at mid-rotor height

The moments on each blade face, which act to produce energy when they are positive, are then summed and plotted as the overall efficiency. The graphs only illustrate a single blade. Hence, the average efficiency plot 402 is generated from the addition of efficiencies calculated for both blades. The practical result is that another set of plots that are 180° out of phase with the plots shown are added to the plots that are shown in FIG. 4B, as well as the other efficiency graphs illustrated herein.

The efficiency of the turbine in the wind tunnel and full scale is calculated from the following formulas:

Power Available in the Wind:

$$P_w = \frac{1}{2} p A S^3 \text{ [Watts]} \quad P_w = \text{power available in the wind}$$

p=air density, kg/m³

=1.225 kg/m³ @ sea level

A=rotor swept area, m²

=rotor height×rotor diameter

S=wind speed, m/s

Turbine Power:

$$P_t = \text{Rotor Torque(Nm)} \times \text{Rotational Velocity (rad/sec)} \text{ [Watts]}$$

Turbine Efficiency:

$$\% \text{ Efficiency} = (P_t/P_w) \times 100$$

Once the turbine's efficiency is determined, the turbine power can also be calculated by:

$$P_t = P_w \times \text{efficiency} = \frac{1}{2} p A S^3 \times \text{eff}$$

Figure 5:
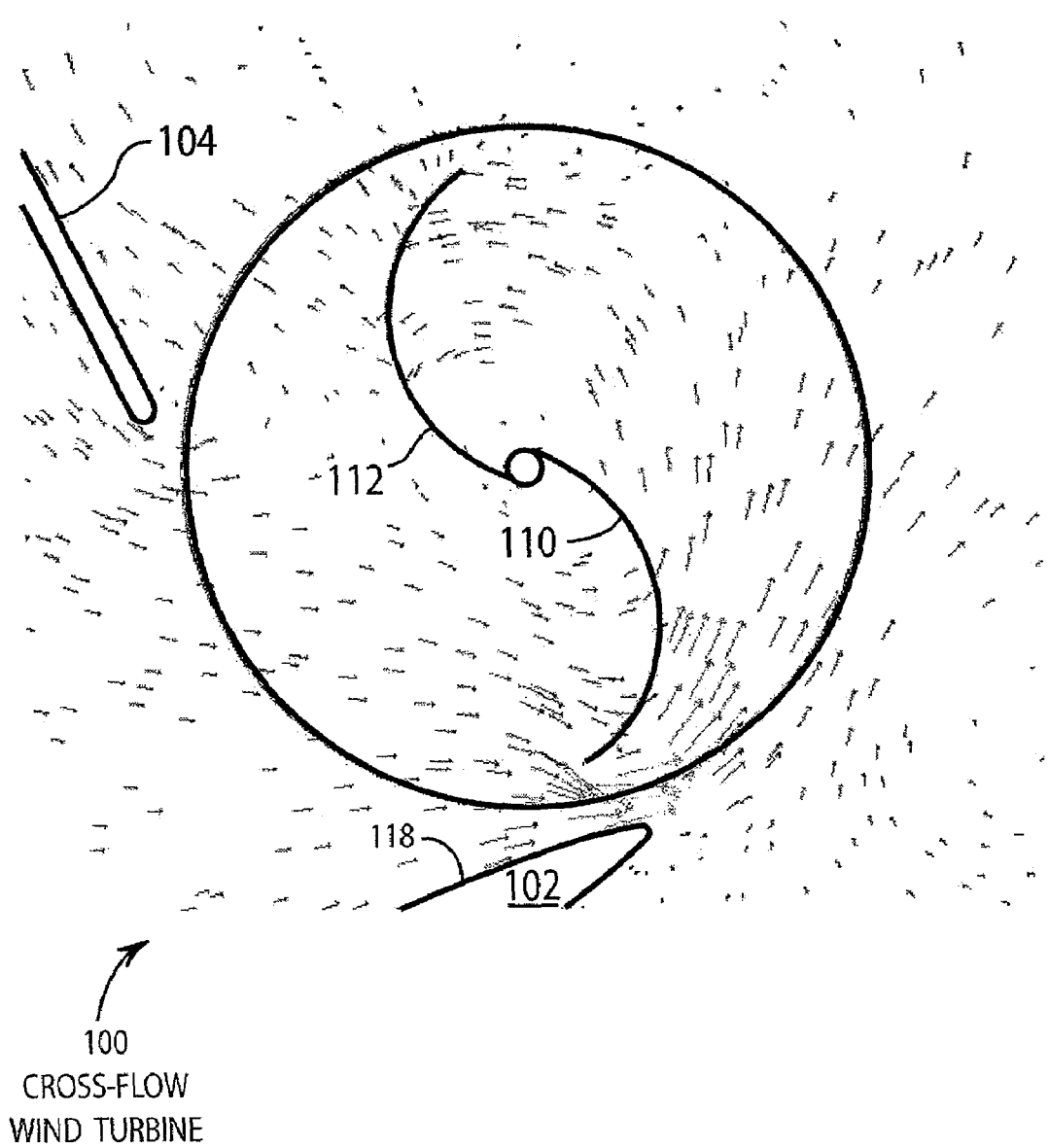
FIG. 5 is a wind velocity and directional flow diagram of the embodiment of FIG. 4A.

FIG. 5 is a wind velocity and directional flow diagram that illustrates the direction of flow of the wind and its intensity. As is illustrated in FIG. 5, the wind accelerates in the gap between the air foil stator 102 and rotor blade 110 as a result of the air flow characteristics of the air foil stator 102 that causes the wind to accelerate on the surface 118 of airfoil stator 102. The length of the arrows in FIG. 5 illustrate the magnitude of the speed of the wind. As shown in FIG. 5, large wind velocities are created along the leading face of the rotor blade 120 which are directed to the trailing face of rotor 112. The large velocities along the surface of the leading face of the rotor blade 110 create a negative pressure while the wind impinging upon the trailing face of rotor 112 create a positive pressure. In addition, stator 104 directs the wind so that it impinges upon the trailing face of rotor blade 110.

Figure 6A:
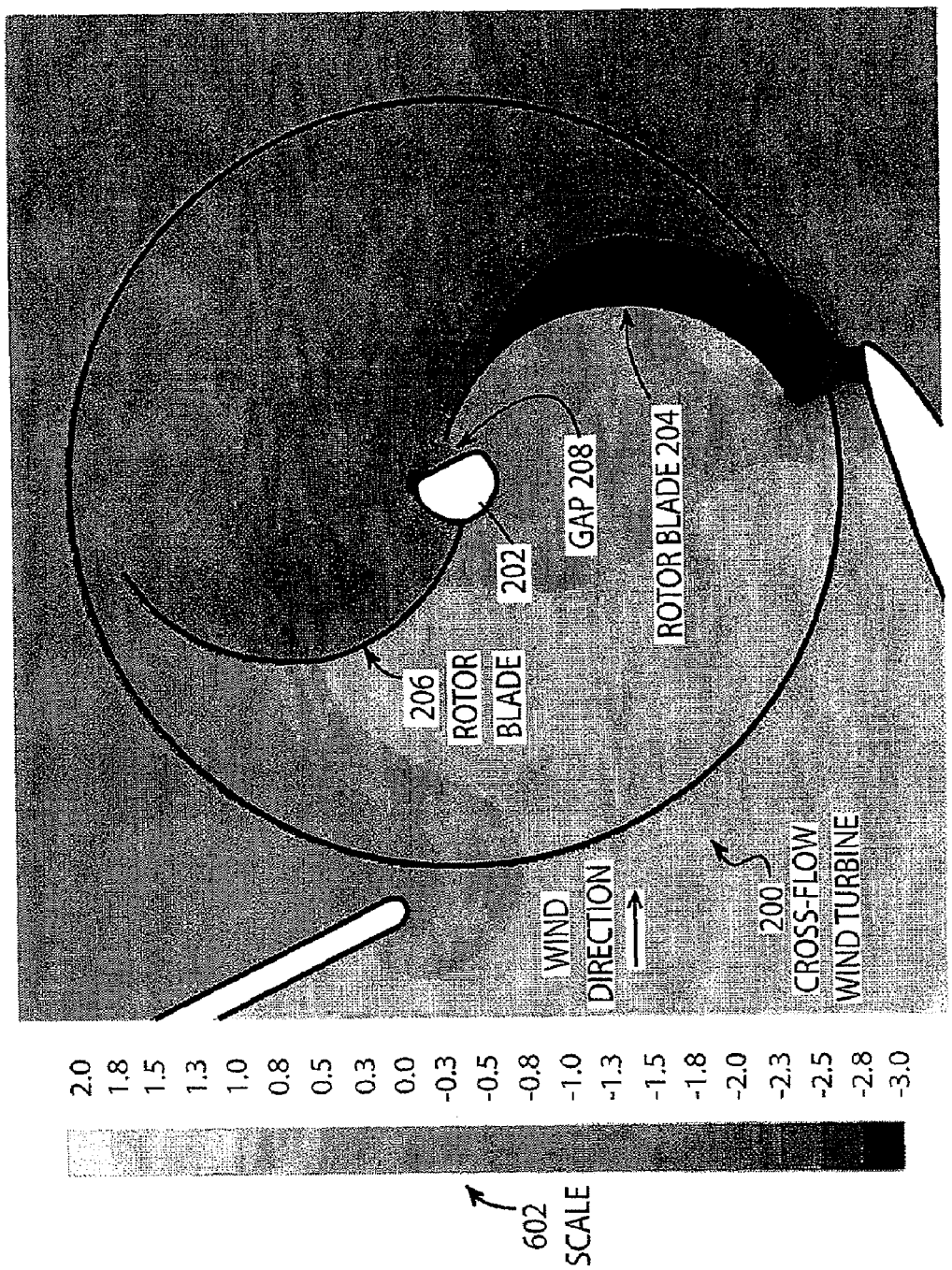
FIG. 6A is an illustration of pressure gradients that are produced by the embodiment of FIG. 6A as calculated from computer simulations using computational fluid dynamics.

FIG. 6A illustrates pressure gradients calculated by computer simulations using computational fluid dynamics for the cross-flow wind turbine 200 that is illustrated in FIG. 2. Scale 602 shows positive pressures as lighter shades and negative pressures as darker shades. In a manner similar to FIG. 4A, large negative pressures are created on the leading face of rotor blade 204 as the rotor blade 204 passes by the air foil stator 214 during the power stroke. The large negative pressures created on the leading face of rotor blade 204 result from the accelerated air flow across the surface of air foil stator 214. These negative pressures function to pull the rotor blade 204 in a counter-clockwise direction around the shaft 202. Positive pressure indicated by lighter shades is created on the trailing face of the rotor blade 204. The large differential pressure created between the leading face and the trailing face of the rotor blade 204 creates a large amount of force on the rotor blade 204 to cause the rotor blade 204 to rotate in a counter-clockwise direction around the shaft 202. This large amount of force created during the power stroke of the cross-flow wind turbine 200 results in higher efficiencies. The gap 208 functions to devent the trailing face of the rotor blade 204, as described above. Wind flows through the gap 208 an impinges upon the trailing face of rotor blade 206. This helps to increase the pressure on the trailing face of rotor blade 206 and minimize the effect of any negative pressures on the trailing face of rotor blade 206 during the return cycle of the rotor blades.

Figure 6B:
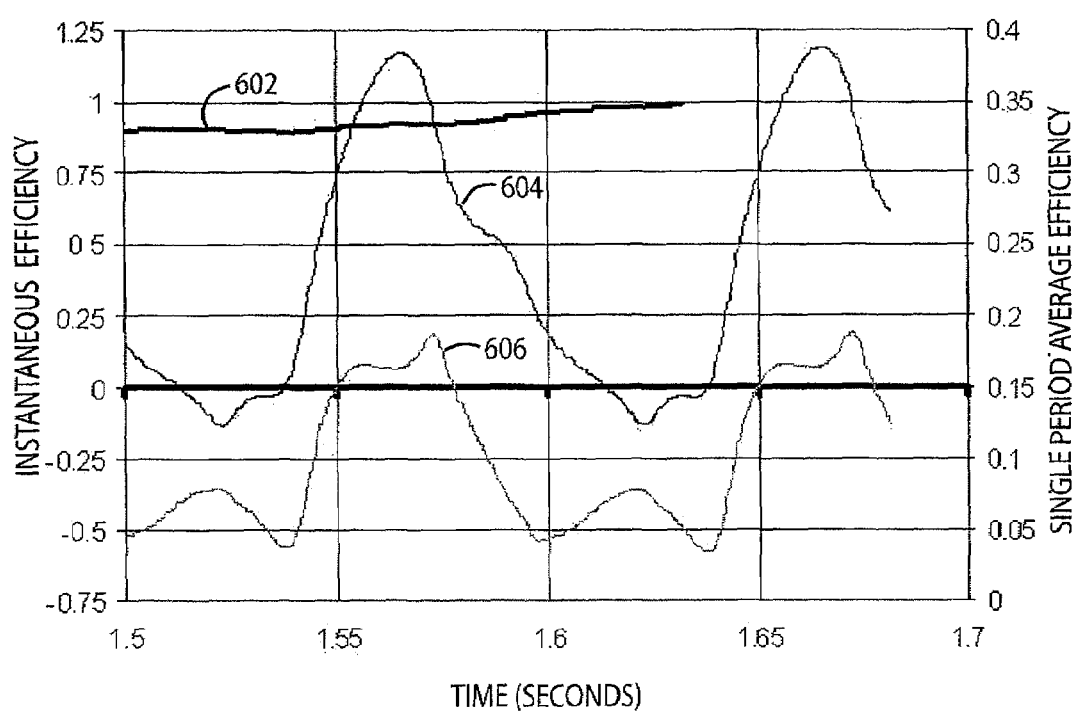
FIG. 6B is an efficiency graph of the embodiment of FIG. 6A.

FIG. 6B is an illustration of the instantaneous efficiency and average efficiency of a single rotor blade versus time for the embodiment of FIG. 2. As can be seen from FIG. 6B the average efficiency illustrated by plot 602 ranges between 33% and 35%. Plot 604 is the instantaneous efficiency of the leading face of the rotor blades of the embodiment of FIG. 2, while plot 606 illustrates the instantaneous efficiency of the trailing face of the rotor blades of the embodiment of FIG. 2.

Figure 7:
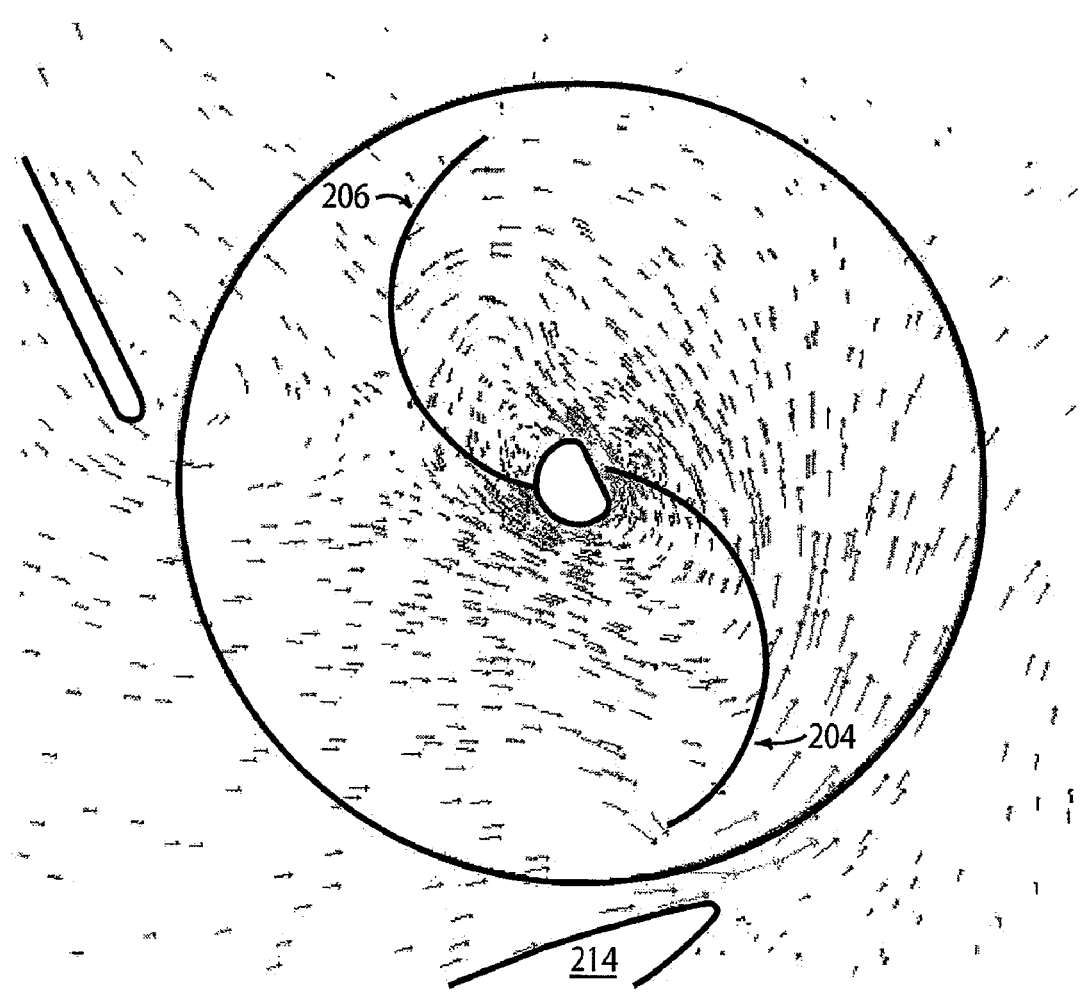
FIG. 7 is a wind velocity and directional flow diagram of the embodiment of FIG. 6A.

FIG. 7 is a wind velocity and directional flow diagram that illustrates the direction of flow of the wind and its intensity for the embodiment of FIG. 2. As illustrated in FIG. 7, the wind accelerates in the gap between the air foil stator 214 and the rotor blade 204 as a result of the flow characteristics of the air foil stator 214 that cause the wind to accelerate on the surface of the air foil stator 214. The length of the arrows in FIG. 7 illustrate the magnitude of the speed of the wind. As also shown in FIG. 7, large wind velocities are created along the leading face of the rotor blade 204 that are directed to the trailing face of rotor blade 206. In addition, wind flowing through the gap 208 also impinges on the trailing face of rotor blade 206. FIG. 7 provides a good visual impression of the wind flow characteristics of the embodiment of FIG. 2.

Figure 8A:
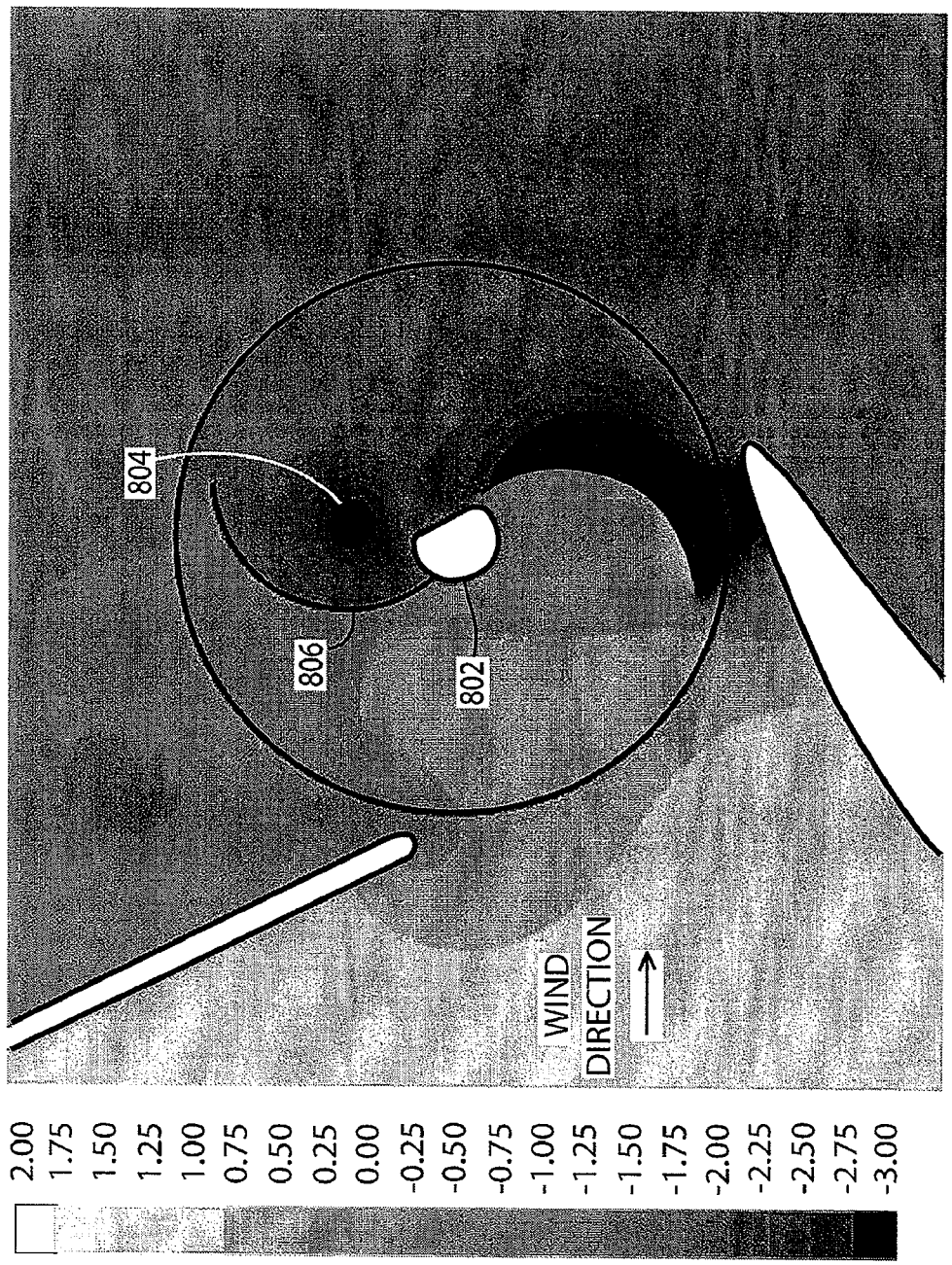
FIG. 8A is an illustration of pressure gradients that are produced by the embodiment of FIG. 8A as calculated from computer simulations using computational fluid dynamics.

FIG. 8A illustrates the pressure gradients calculated by computer simulations using computational fluid dynamics for the embodiment of the cross-flow wind turbine that is illustrated in FIG. 8A. The embodiment of the cross-flow wind turbine illustrated in FIG. 8A is very similar to the embodiment illustrated in FIG. 2, with the exception that the stationary shaft 802 is somewhat larger, thereby creating a larger gap during certain portions of the cycle of rotation. In addition, the rotors are slightly shorter. As can be seen from FIG. 8A, the wind flow patterns create a vortex 804 on the trailing face of rotator blade 806 during the return cycle. This vortex is not created in the embodiment of FIG. 2, as shown in FIG. 6A. As a result, the efficiencies of the embodiment of FIG. 8A are not quite as high as the efficiencies of the embodiment of FIG. 2, as illustrated with more specificity in FIG. 8B.

Figure 8B:
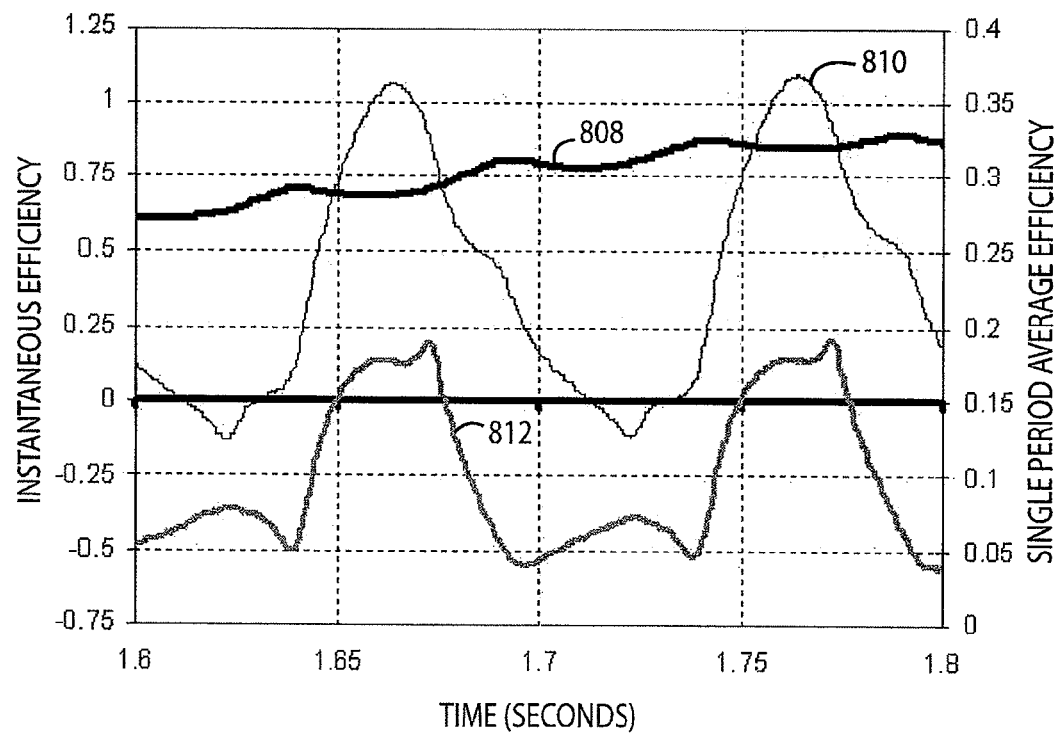
FIG. 8B is an efficiency graph of the embodiment of FIG. 8A.

FIG. 8B is an illustration of instantaneous efficiency and average efficiency of a single rotor blade versus time for the embodiment illustrated in FIG. 8A. As can be seen from FIG. 8B, the average efficiency illustrated by plot 808 ranges between 27% and 33%. Plot 810 illustrates the instantaneous efficiency of the leading face of the rotor blades of the embodiment of FIG. 8A, while plot 812 illustrates the instantaneous efficiency of the trailing face of the rotor blades of the embodiment of FIG. 8A.

Figure 9:
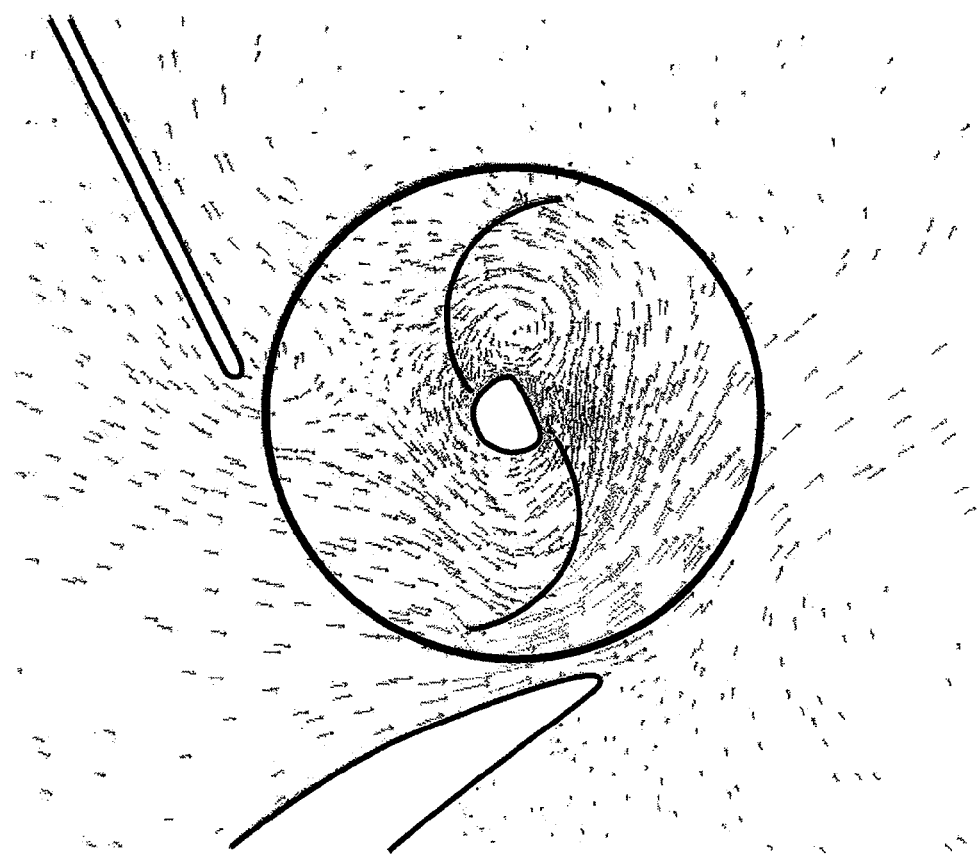
FIG. 9 is a wind velocity and directional flow diagram of the embodiment of FIG. 8A.

FIG. 9 is a wind velocity and directional flow diagram that illustrates the direction of flow of the wind and its intensity for the embodiment of FIG. 8A. FIG. 9 illustrates the manner in which large negative pressures are created on the leading face of the rotor blade as a result of the accelerated air flow on the air foil. FIG. 9 also illustrates the manner in which the vortex is formed from wind flowing between the gap caused by the recessed portion of the shaft 802 and the rotor blade, as well as the accelerated wind from the air foil.

Figure 10A:
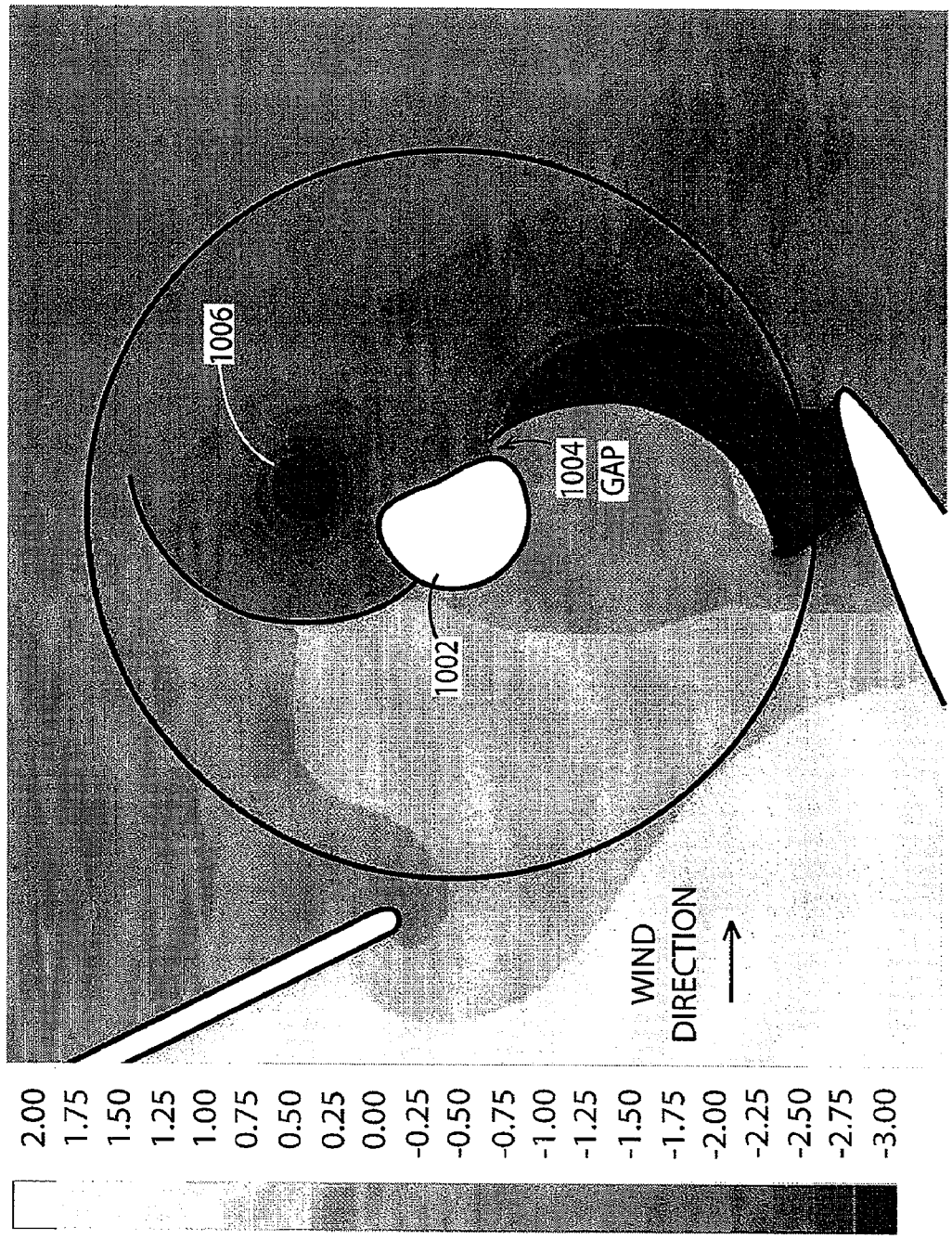
FIG. 10A is an illustration of pressure gradients that are produced by the embodiment of FIG. 10A as calculated from computer simulations using computational fluid dynamics.

FIG. 10A illustrates pressure gradients calculated by computer simulations using computational fluid dynamics for the cross-flow wind turbine embodiment illustrated in FIG. 10A. The embodiment illustrated in FIG. 10A is similar to the embodiment of FIG. 8A but includes a stationary shaft 1002 that is larger than the stationary shaft 802 of FIG. 8A. As a result, a larger gap 1004 is formed between the rotor blades in the stationary shaft 1002 during certain portions of the cycle of rotation. A vortex 1006 is also created by the embodiment of FIG. 10A.

Figure 10B:
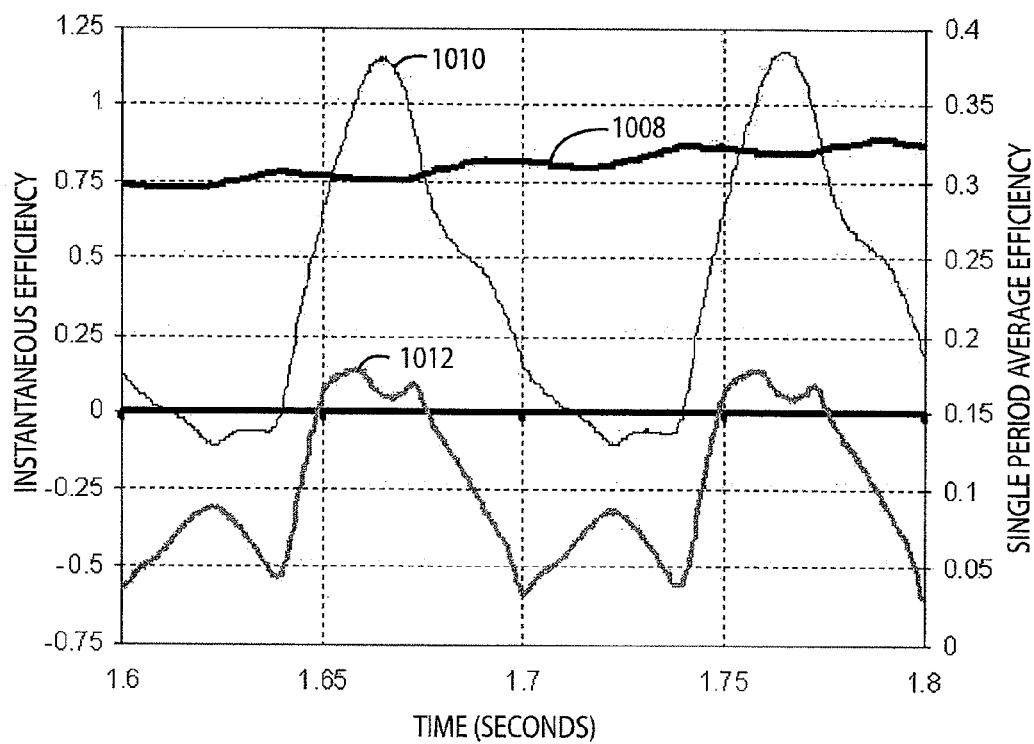
FIG. 10B is an efficiency graph of the embodiment of FIG. 10A.

FIG. 10B is an illustration of instantaneous efficiency and average efficiency of a single rotor blade versus time for the embodiment of FIG. 10A. As can be seen from FIG. 10B, the average efficiency illustrated by plot 1008 ranges between 29% and 33%. Plot 1010 illustrates the instantaneous efficiency of the leading face of the rotor blades of the embodiment of FIG. 10A. Plot 1012 illustrates the instantaneous efficiency of the trailing face of the rotor blades. Average efficiencies are calculated in the manner described above.

Figure 11:
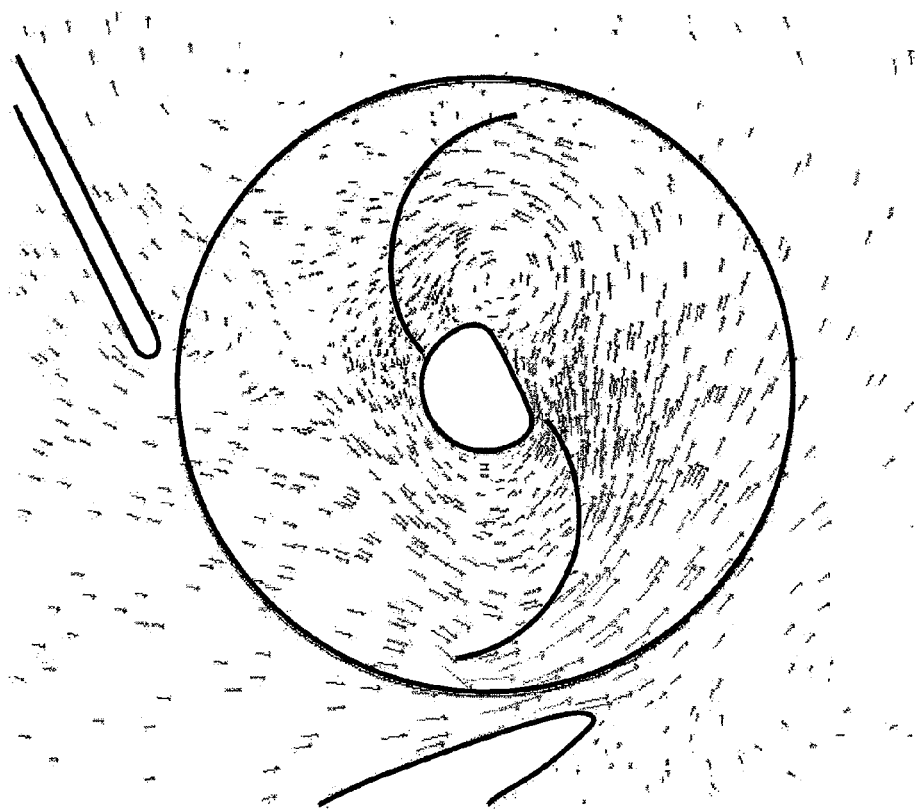
FIG. 11 is a wind velocity and directional flow diagram of the embodiment in FIG. 10A.

FIG. 11 is a wind velocity and directional flow diagram that illustrates the direction of flow of the wind and its intensity for the embodiment of FIG. 10A. FIG. 11 provides a good visual manner of disclosing the operation of the embodiment of FIG. 10A.

Figure 12A:
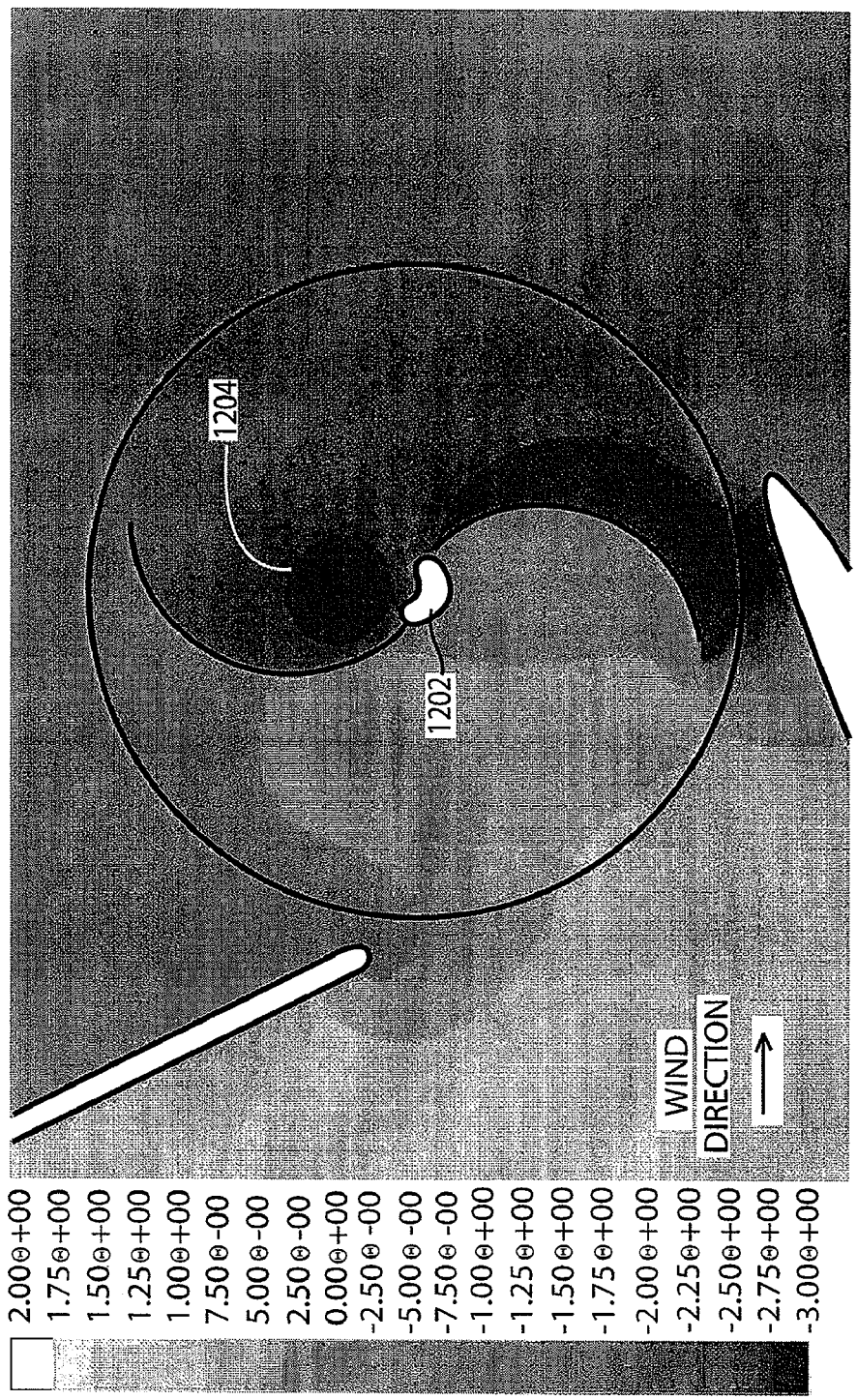
FIG. 12A is an illustration of pressure gradients that are produced by the embodiment of FIG. 12A as calculated from computer simulations using computational fluid dynamics.

FIG. 12A illustrates pressure gradients calculated by computer simulations using computational fluid dynamics for the embodiment of the cross-flow wind turbine that is illustrated in FIG. 12A. Stationary shaft 1202 is a kidney bean shaped stationary shaft that forms a large gap during certain portions of the rotational cycle of the rotor blades around the stationary shaft 1202. As can be seen from FIG. 12A, a fairly large low pressure vortex is formed on the trailing face of the rotors during the return cycle.

Figure 12B:
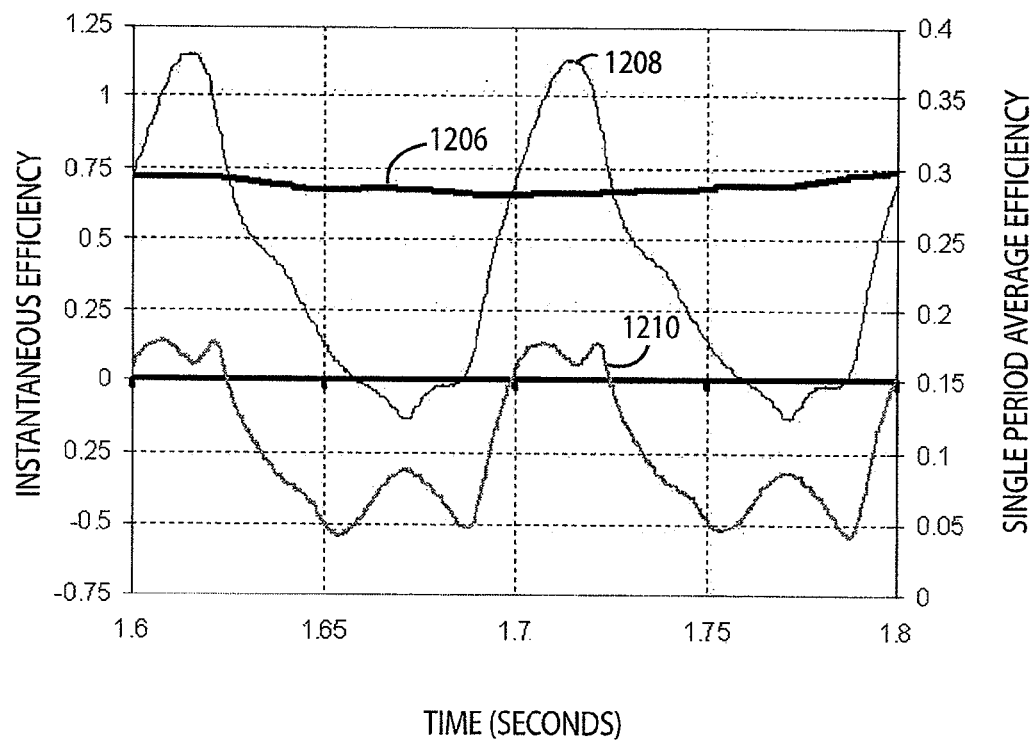
FIG. 12B is an efficiency graph of the embodiment of FIG. 12A.

FIG. 12B is an illustration of the instantaneous efficiency and average efficiency of a single rotor blade versus time for the embodiment illustrated in FIG. 12A. As can be seen from FIG. 12B, the average efficiency that is illustrated by plot 1206 ranges between 28% and 30%. The instantaneous efficiency of the leading face of the rotor blades is illustrated by plot 1208. The instantaneous efficiency of the trailing face of the rotor blades is illustrated by plot 1210. The average efficiency illustrated by plot 1206 is calculated in the manner described above.

Figure 13:
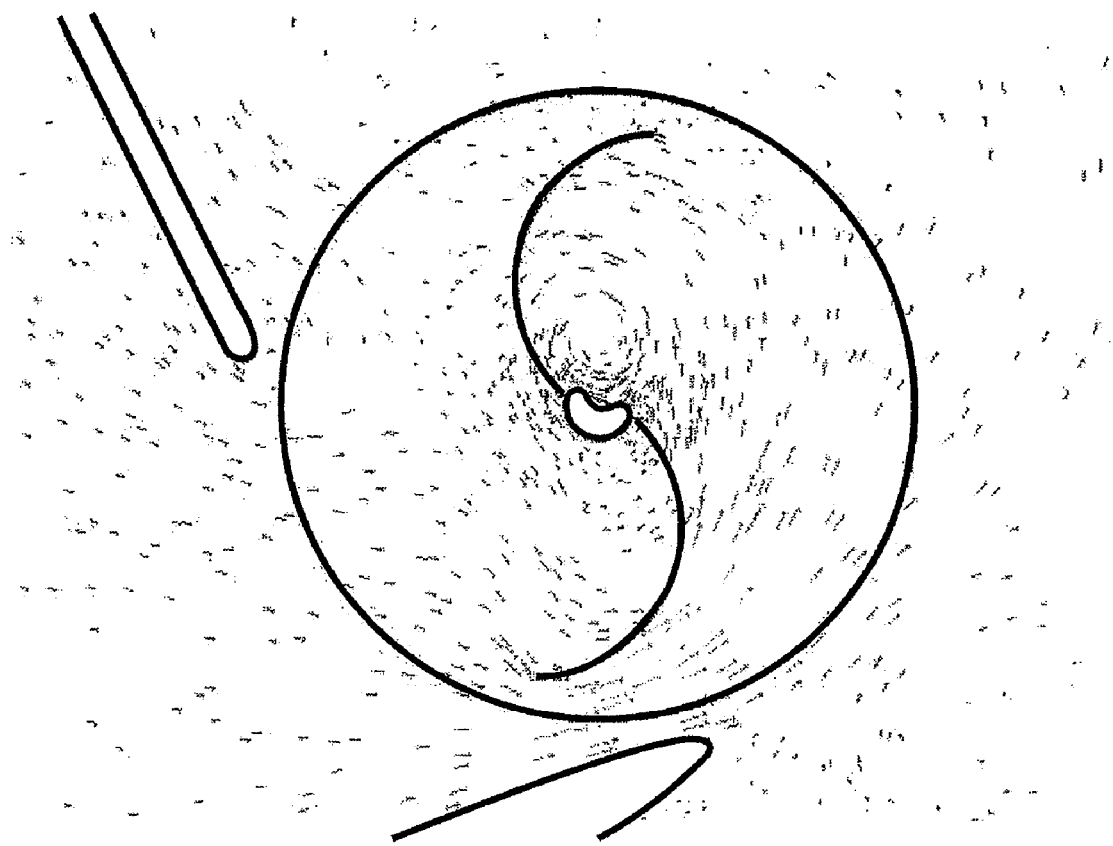
FIG. 13 is a wind velocity and directional flow diagram of the embodiment of FIG. 12A.

FIG. 13 is a wind velocity and directional flow diagram that illustrates the direction of flow of the wind and its intensity for the embodiment illustrated in FIG. 12A. The diagram of FIG. 13 illustrates the manner in which the vortex 1202 is formed.

Figure 14A:
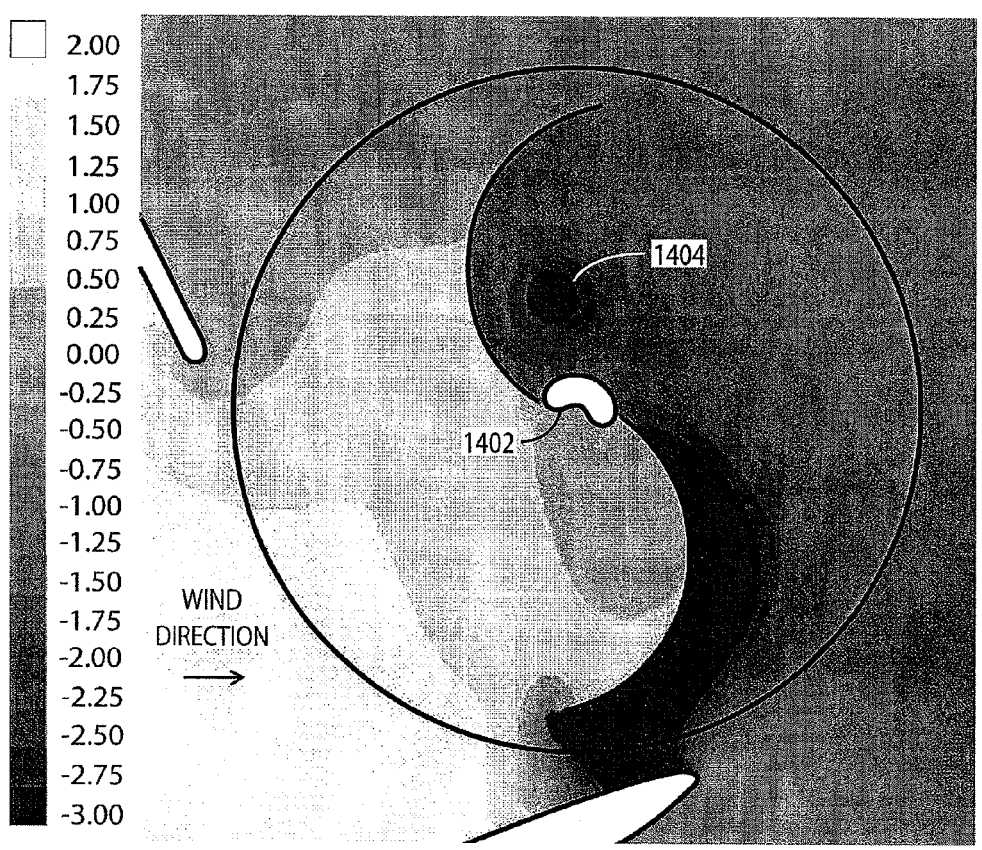
FIG. 14A is an illustration of pressure gradients that are produced by the embodiment of FIG. 14A as calculated from computer simulations using computational fluid dynamics.

FIG. 14A illustrates pressure gradients calculated by computer simulations using computational fluid dynamics for the embodiment of a cross-flow wind turbine illustrated in FIG. 14A. The embodiment of FIG. 14A uses a kidney shaped stationary shaft 1402 that is similar to the kidney shaped stationary shaft 1202 of the embodiment of FIG. 12A, but stationary shaft 1402 is positioned so that a gap is formed during a different portion of the rotational cycle. Again, a vortex 1404 is formed near the trailing face of the rotor blades during the return cycle.

Figure 14B:
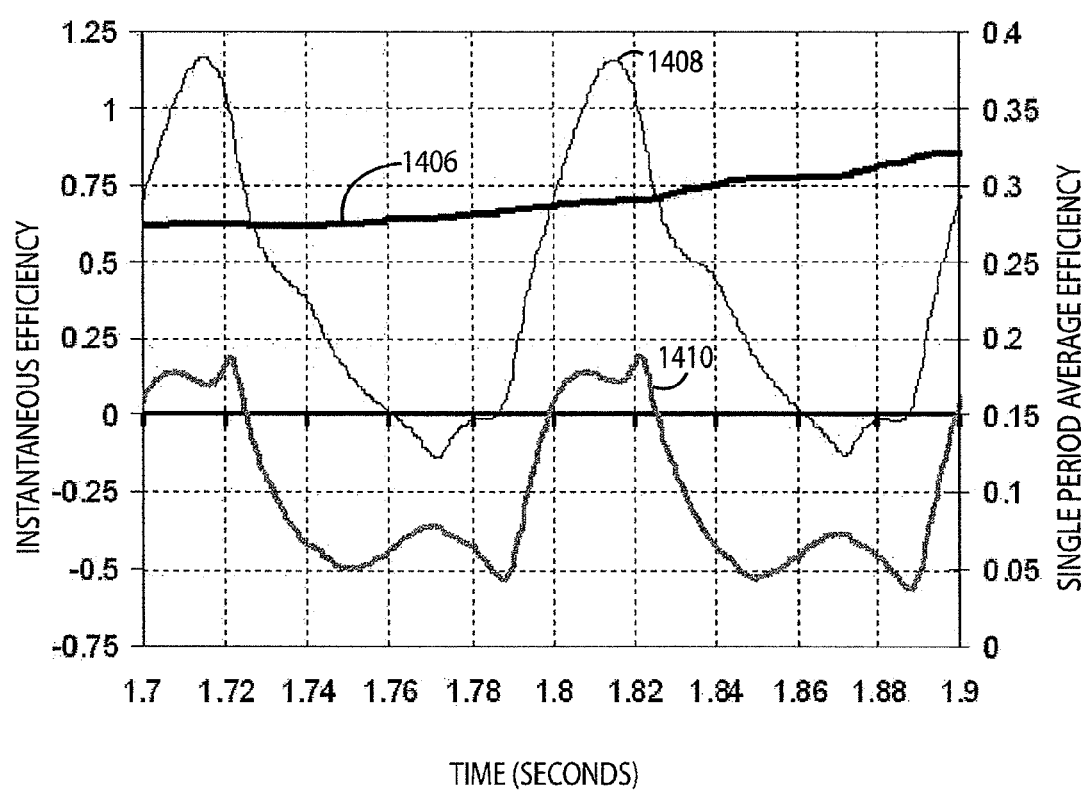
FIG. 14B is an efficiency graph of the device of FIG. 14A.

FIG. 14B is a illustration of the instantaneous efficiency and average efficiency of a single rotor blade versus time for the embodiment illustrated in FIG. 14A. As can be seen from FIG. 14B, the average efficiency illustrated by plot 1406 ranges between 27% and 32%. Plot 1408 illustrates the instantaneous efficiency of the leading face of the rotor blades of the embodiment of FIG. 14A. Plot 1410 illustrates the instantaneous efficiency of the trailing face of the rotor blades.

Figure 15:
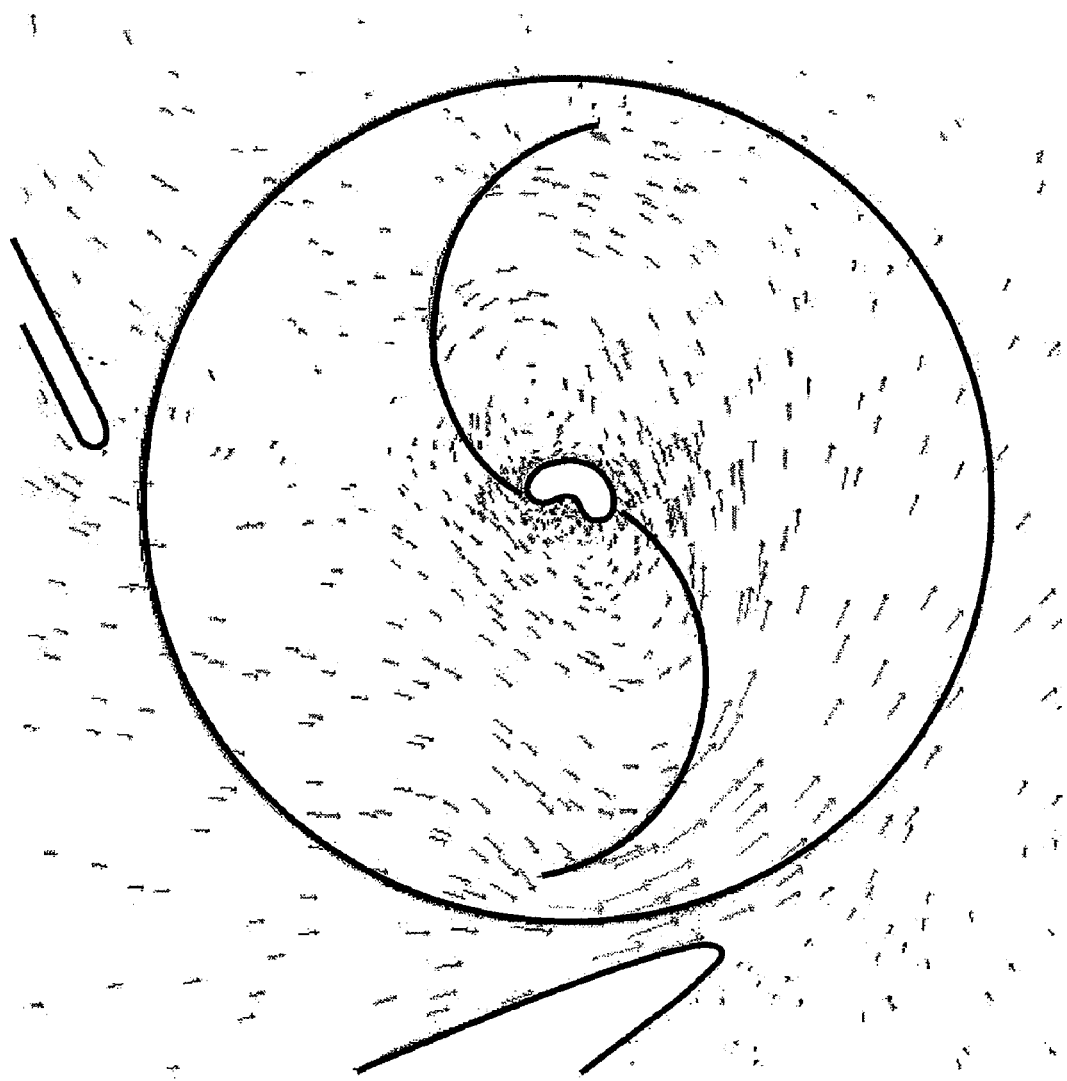
FIG. 15 is a wind velocity and directional flow diagram of the embodiment of FIG. 14A.

FIG. 15 is a wind velocity and directional flow diagram that illustrates the direction of flow of the wind and its intensity for the embodiment of FIG. 14A. FIG. 15 illustrates the flow patterns and intensities that allows a visual interpretation of the manner of operation of the cross-flow wind turbine illustrated in FIG. 14A.

Figure 16A:
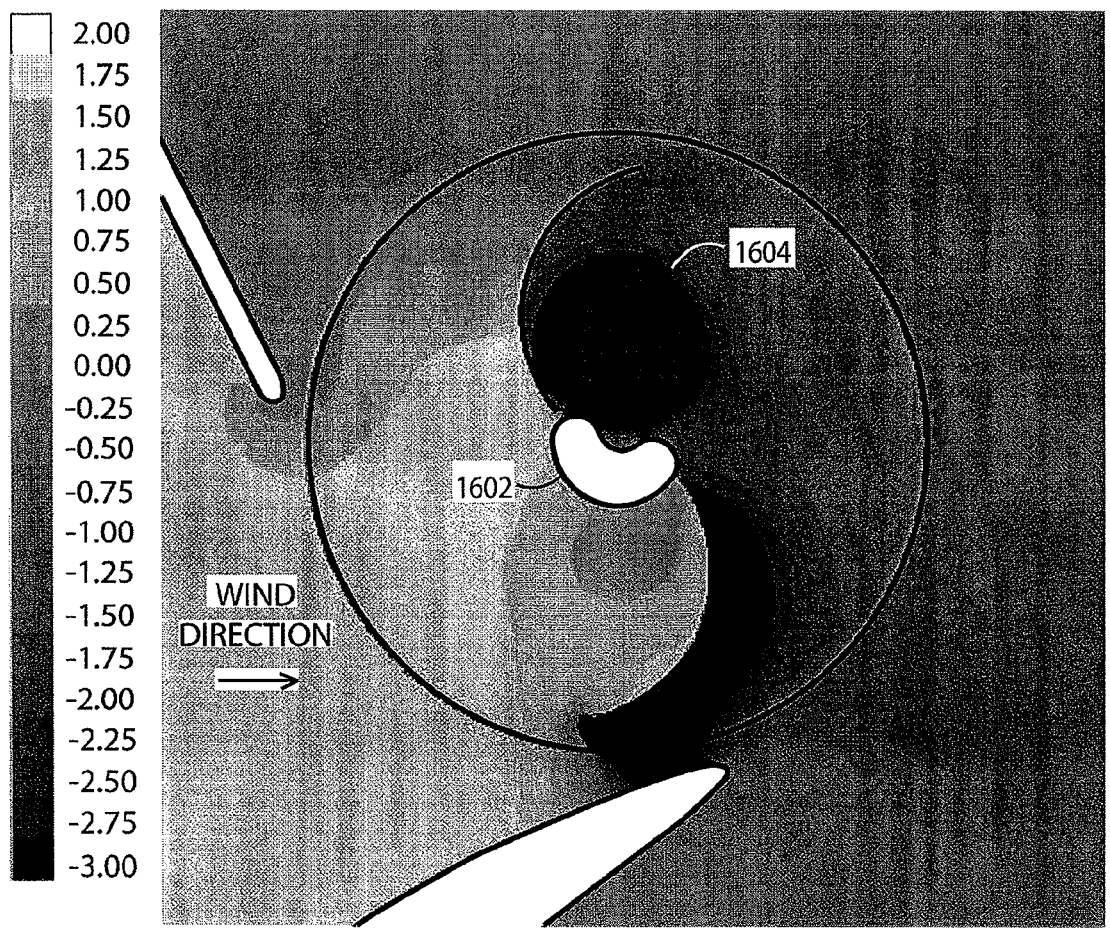
FIG. 16A is an illustration of pressure gradients that are produced by the embodiment of FIG. 16A as calculated from computer simulations using computational fluid dynamics.

FIG. 16A illustrates pressure gradients calculated by computer simulations using computational fluid dynamics for an embodiment of a cross-flow wind turbine that is illustrated in FIG. 16A. FIG. 16A is similar to the embodiment of FIG. 12A, except that FIG. 16A uses a kidney bean shaped stationary shaft 1602 that is larger than stationary shaft 1202 of FIG. 12A. The larger shaft reduces the size of the rotor blades and provides a larger gap between the shaft and the rotor blades. The result is a large vortex 1604 that creates a large negative pressure area on the trailing face of the rotor blades during the return portion of the rotational cycle.

Figure 16B:
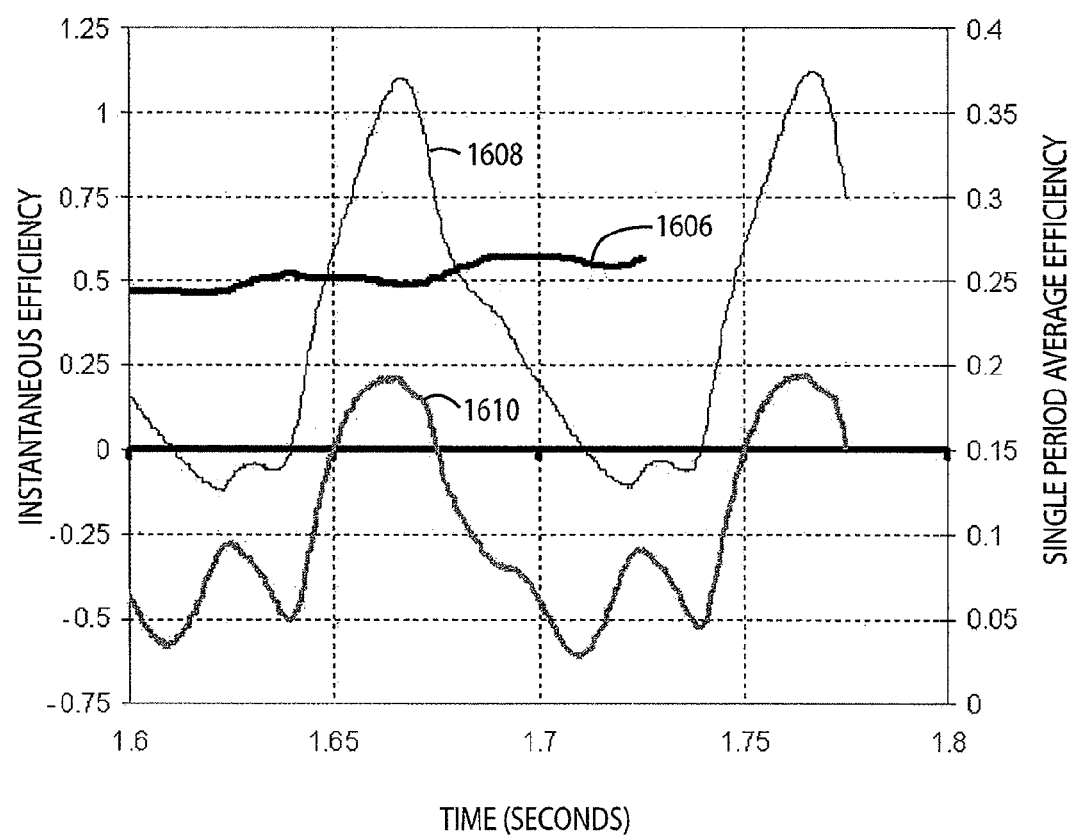
FIG. 16B is an efficiency graph of the embodiment of FIG. 16A.

FIG. 16B is an illustration of instantaneous efficiency and average efficiency of a single rotor blade versus time for the embodiment illustrated in FIG. 16A. As can be seen from FIG. 16B, the average efficiency, illustrated by plot 1606, ranges between 24% and 26%. Plot 1608 illustrates the instantaneous efficiency of the leading face of the rotor blades of the embodiment illustrated in FIG. 16A. Plot 1610 illustrates the instantaneous efficiency of the trailing face of the rotor blades.

Figure 17:
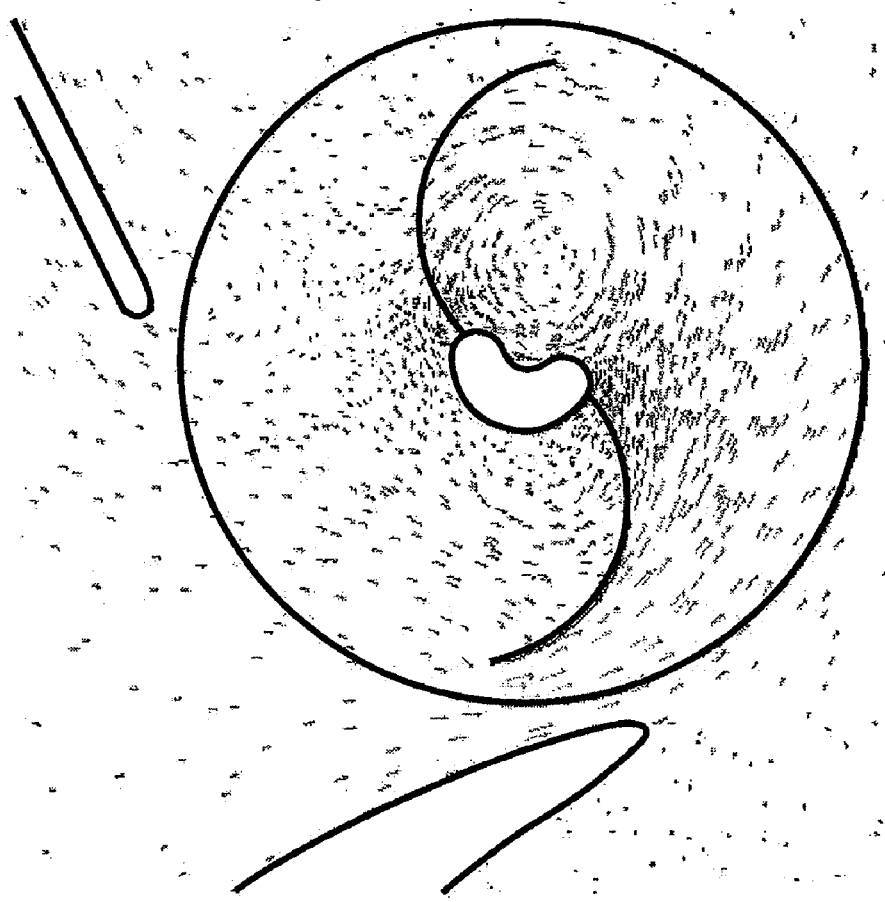
FIG. 17 is a wind velocity and directional flow diagram of the device of FIG. 16A.

FIG. 17 is a wind velocity and directional flow diagram that illustrates the direction of flow of the wind and its intensity for the embodiment illustrated in FIG. 16A. FIG. 17 provides a good visual interpretation of the operation of the embodiment of FIG. 16A.

Figure 18A:
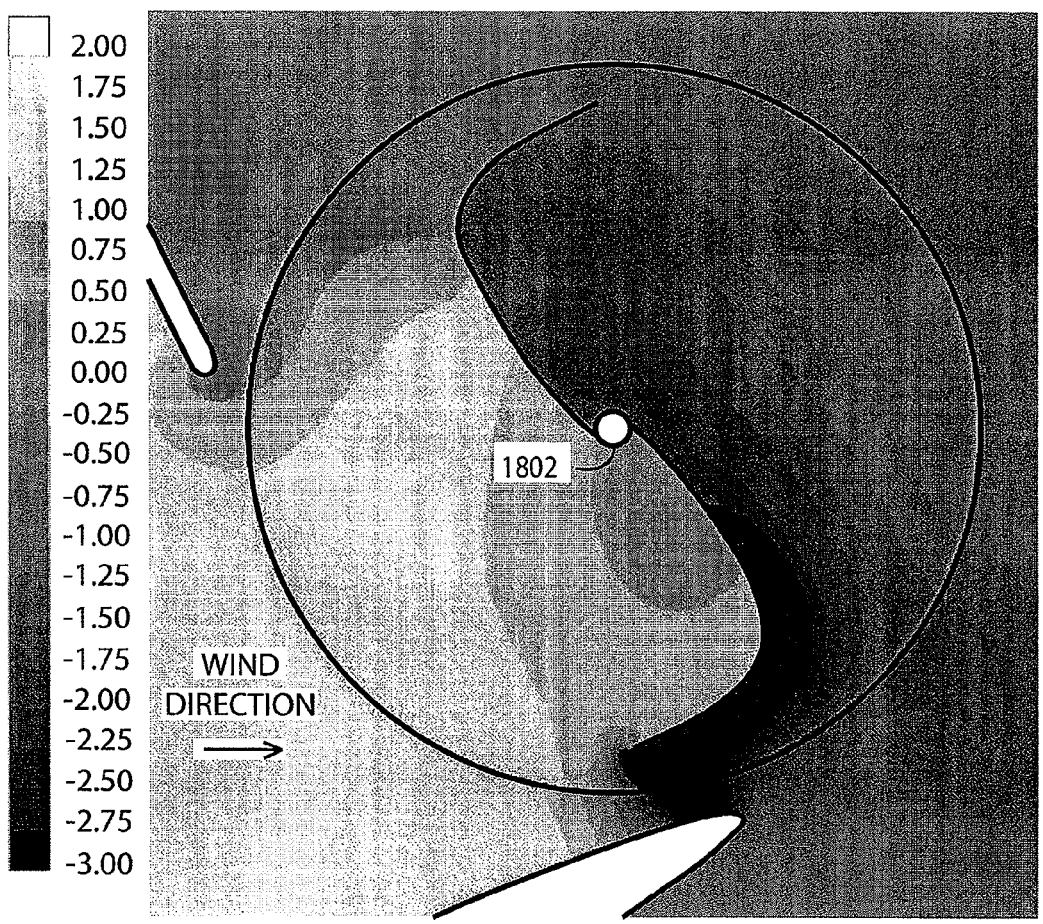
FIG. 18A is an illustration of pressure gradients that are produced by the embodiment of FIG. 18A as calculated from computer simulations using computational fluid dynamics.

FIG. 18A illustrates pressure gradients calculated by computer simulations using computational fluid dynamics for the embodiment of a cross-flow wind turbine that is illustrated in FIG. 18A. The rotor blades illustrated in FIG. 18A have a J-shaped pattern rather than the semi-circular 120° arc pattern used in other embodiments disclosed herein. Shaft 1802 is a rotating shaft that is connected to the rotor blades of the embodiment illustrated in FIG. 18A.

Figure 18B:
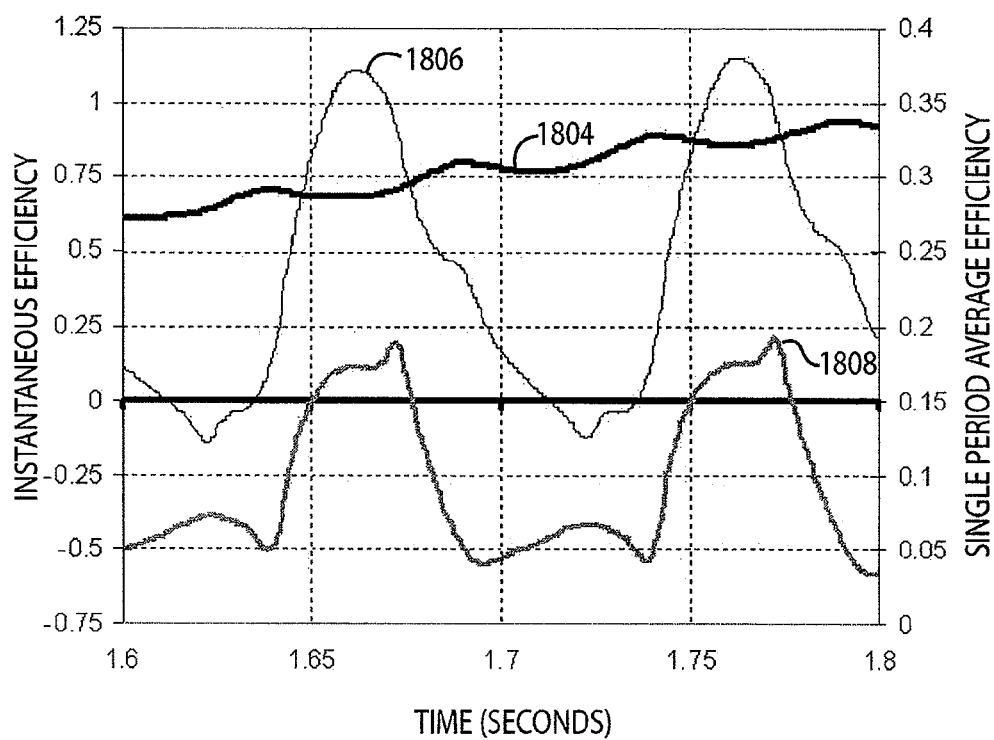
FIG. 18B is an efficiency graph of the embodiment illustrated in FIG. 18A.

FIG. 18B is an illustration of the instantaneous efficiency and average efficiency of a single rotor blade versus time for the embodiment illustrated in FIG. 18A. As can be seen from FIG. 18B, the average efficiency illustrated by plot 1804 ranges between 27% and 34%. Plot 1806 illustrates the instantaneous efficiency of the leading face of the rotor blades of the embodiment of FIG. 18A. Plot 1808 illustrates the instantaneous efficiency that is calculated for the trailing face of the rotor blades using the methods described above.

Figure 19:
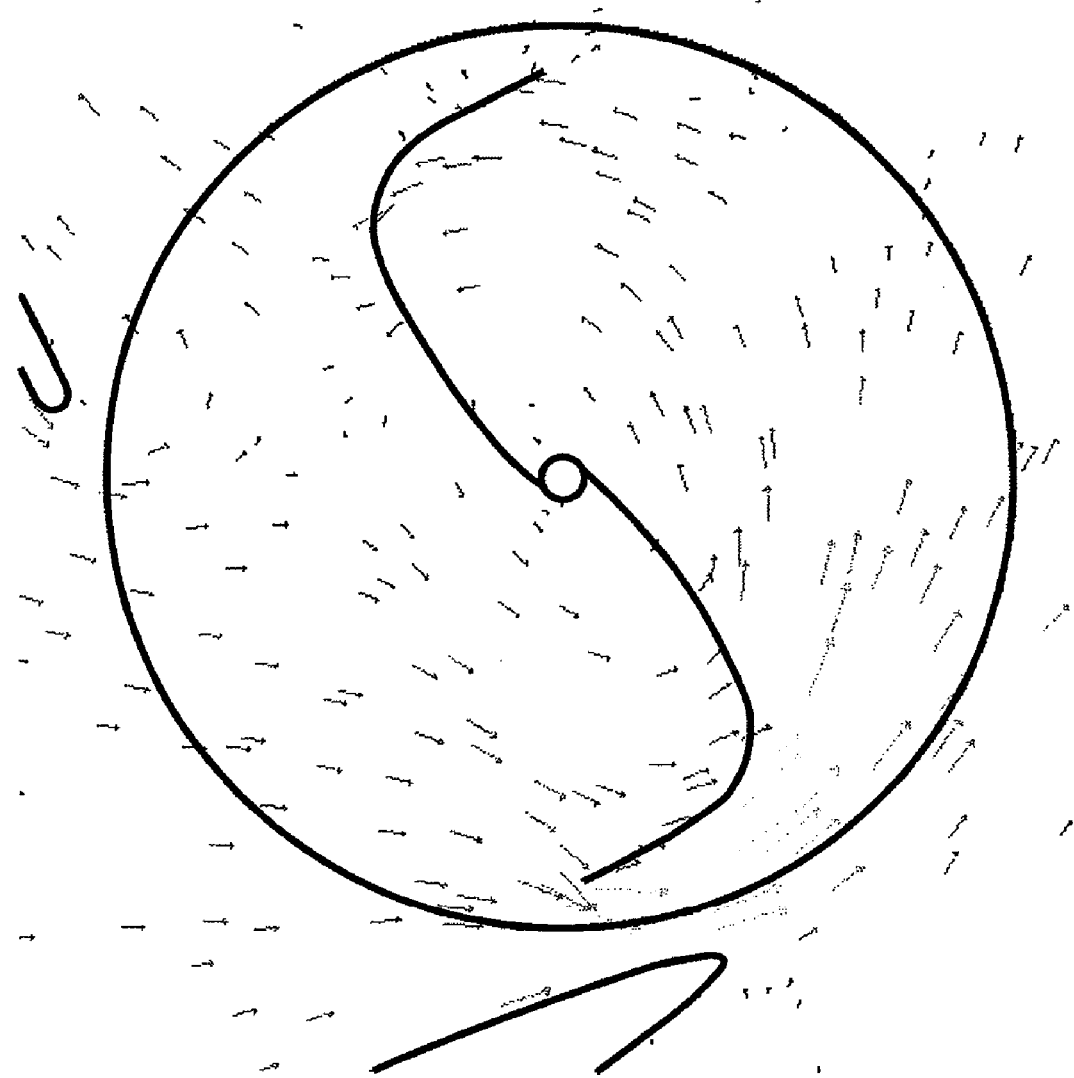
FIG. 19 is a wind velocity and directional flow diagram of the embodiment illustrated in FIG. 18A.

FIG. 19 is a wind velocity and directional flow diagram that illustrates the direction of flow of the wind and its intensity for the embodiment illustrated in FIG. 18A. FIG. 19 provides a good visual interpretation of the operation of the embodiment of the cross-flow wind turbine illustrated in FIG. 18A.

Figure 20A:
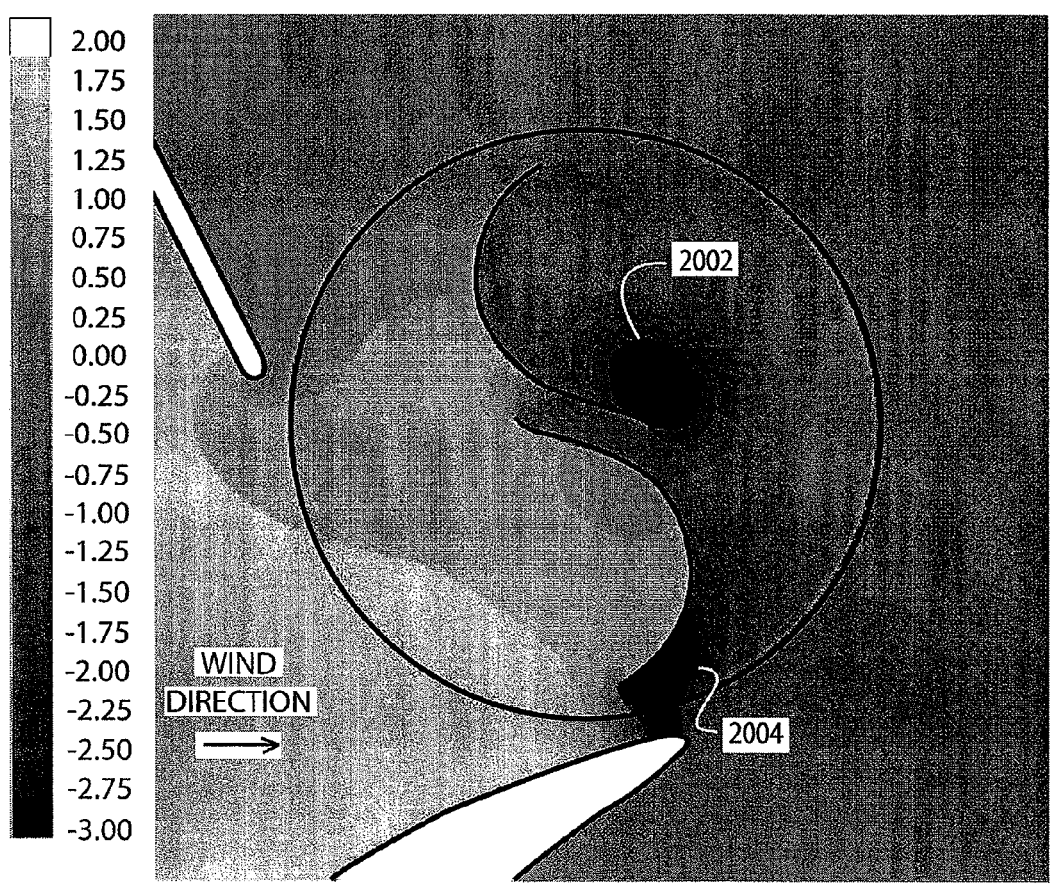
FIG. 20A is an illustration of pressure gradients that are produced by the embodiment of FIG. 20A as calculated from computer simulations using computational fluid dynamics.

FIG. 20A illustrates pressure gradients calculated by computer simulations using computational fluid dynamics for the embodiment of a cross-flow wind turbine that is illustrated in FIG. 20A. As shown in FIG. 20A, the rotor blades are arranged in a reverse offset configuration so that a gap is formed between the rotor blades. This simulation shows the creation of a vortex 2002 that is located more centrally on the trailing face of the rotor blades during the return cycle. The negative pressure area 2004 formed between the rotor blade and the air foil during the power stroke is much smaller than the negative pressure areas in other embodiments disclosed herein.

Figure 20B:
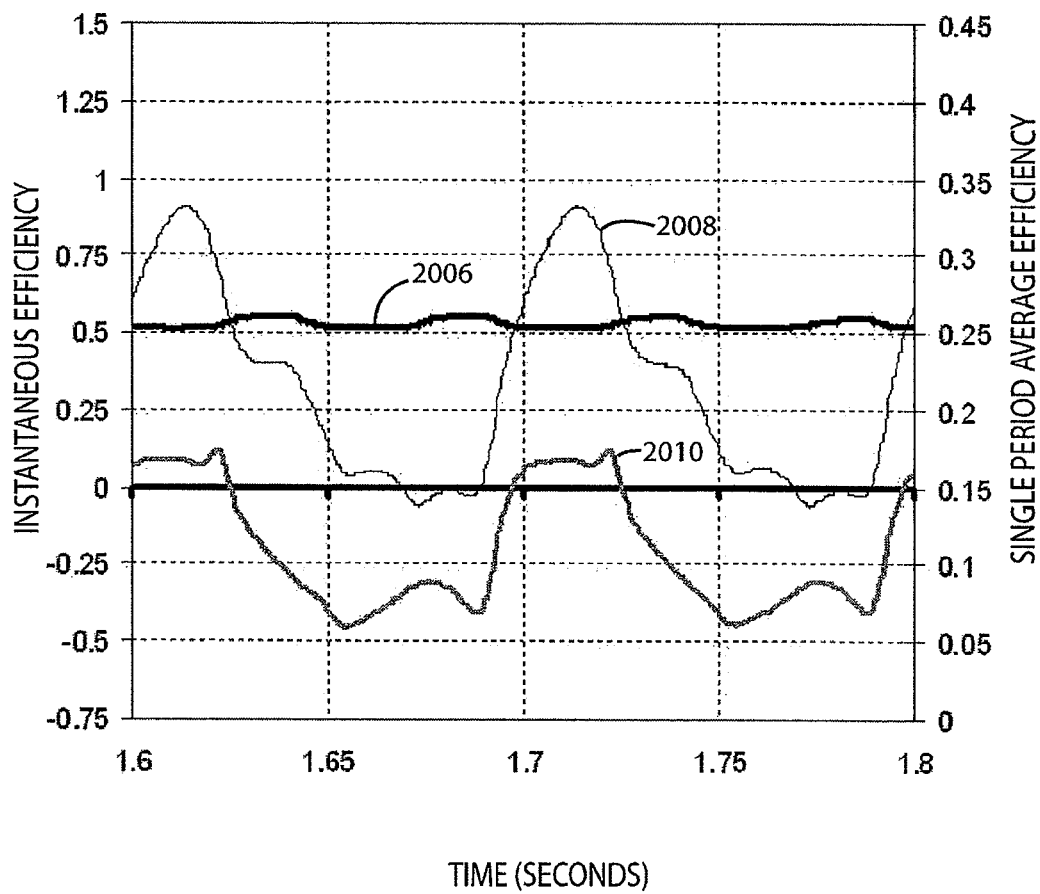
FIG. 20B is an efficiency graph of the embodiment illustrated in FIG. 20A.

FIG. 20B is an illustration of instantaneous efficiency and average efficiency of a single rotor blade versus time for the embodiment illustrated in FIG. 20A. As can be seen from FIG. 20B, the average efficiency illustrated by plot 2006 ranges between 25% and 26%. Plot 2008 illustrates the instantaneous efficiency of the leading face of the rotor blades of the embodiment of FIG. 20A. Plot 2010 illustrates the instantaneous efficiency of the trailing face of the rotor blades. As is apparent from FIG. 20B, the smaller negative pressure area during the power stroke results in much lower efficiencies in the embodiment of FIG. 20A.

Figure 21:
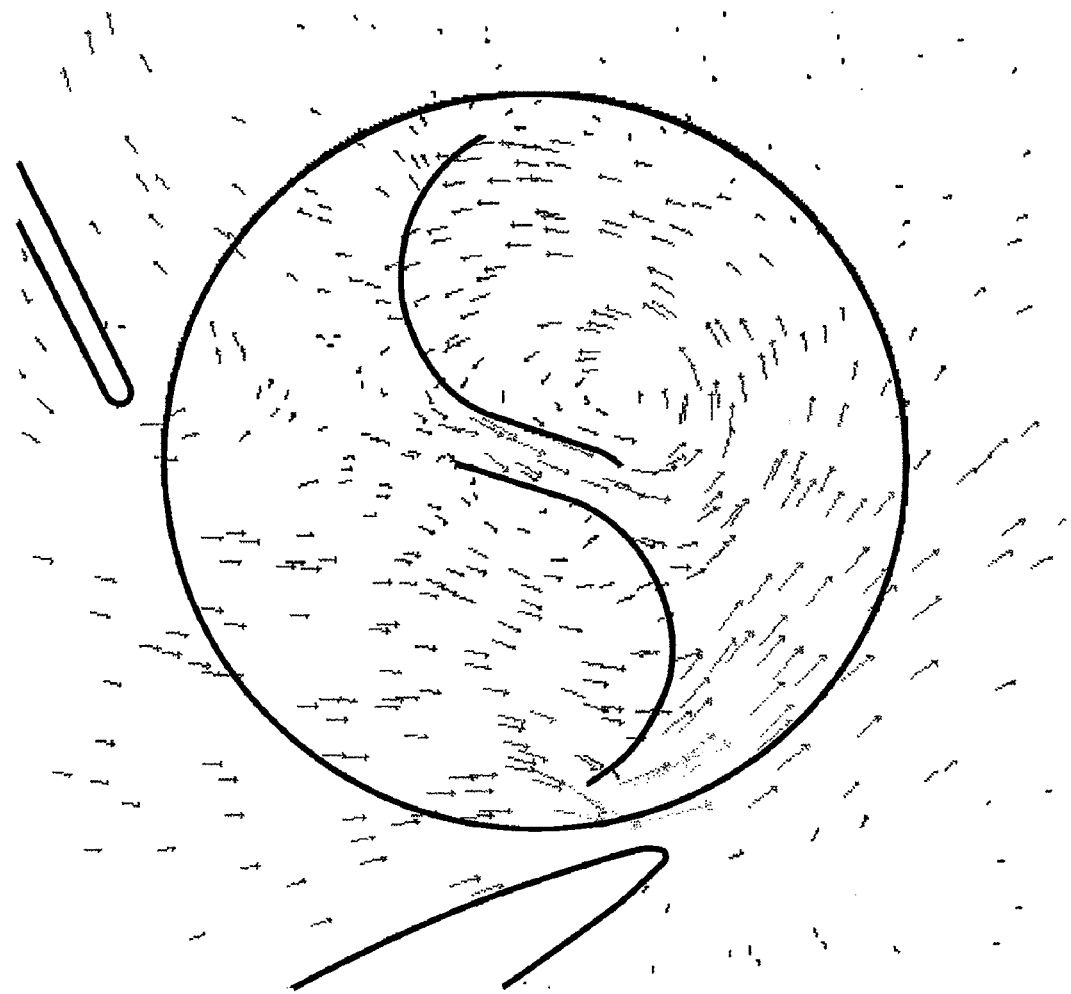
FIG. 21 is a wind velocity and directional flow diagram of the embodiment illustrated in FIG. 20A.

FIG. 21 is a wind velocity and directional flow diagram that illustrate the direction and flow of the wind and its intensity for the embodiment of FIG. 20A. FIG. 21 provides a good visual indication of the operation of the embodiment of FIG. 20A.

Figure 22A:
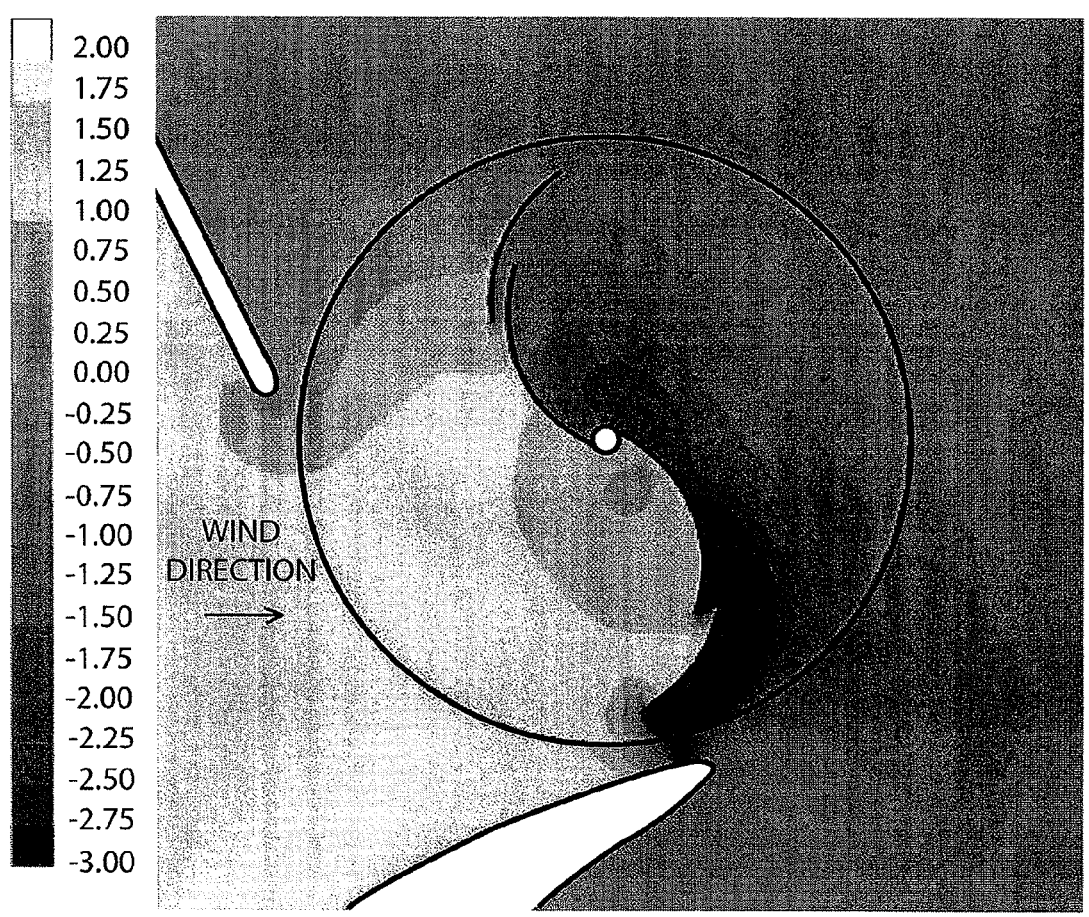
FIG. 22A is an illustration of pressure gradients that are produced by the embodiment of FIG. 22A as calculated from computer simulations using computational fluid dynamics.

FIG. 22A illustrates pressure gradients calculated by computer simulations using computational fluid dynamics for an embodiment of the cross-flow wind turbine that is illustrated in FIG. 22A. The embodiment of FIG. 22A uses a split rotor blade and a small rotating shaft.

Figure 22B:
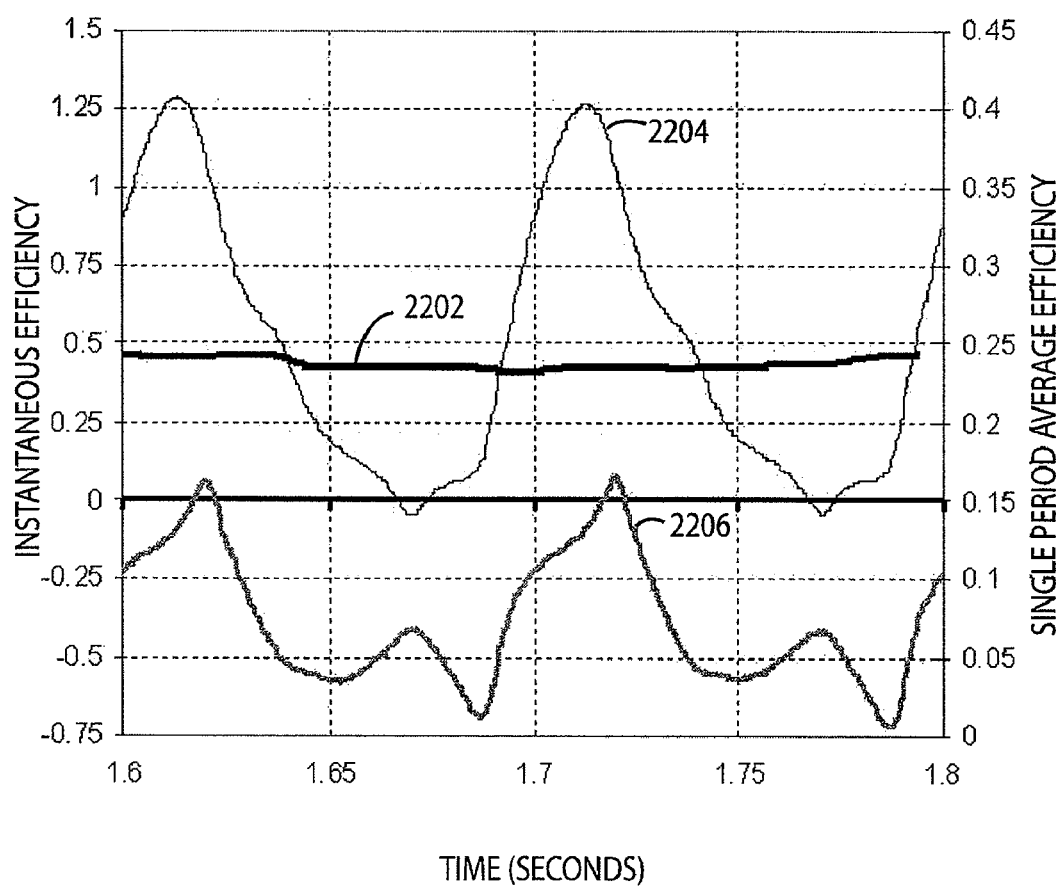
FIG. 22B is an efficiency graph of the embodiment of FIG. 22A.

FIG. 22B is an illustration of instantaneous efficiency and average efficiency of a single rotor blade versus time for the embodiment of FIG. 22A. As can be seen from FIG. 22B, the average efficiency illustrated by plot 2202 ranges between 23% and 24%. Plot 2204 illustrates the calculated instantaneous efficiency of the leading face of the rotor blades of the embodiment of FIG. 22A. Plot 2206 illustrates the instantaneous efficiency calculated for the trailing face of the rotor blades. Efficiencies are calculated in the manner described above.

Figure 23:
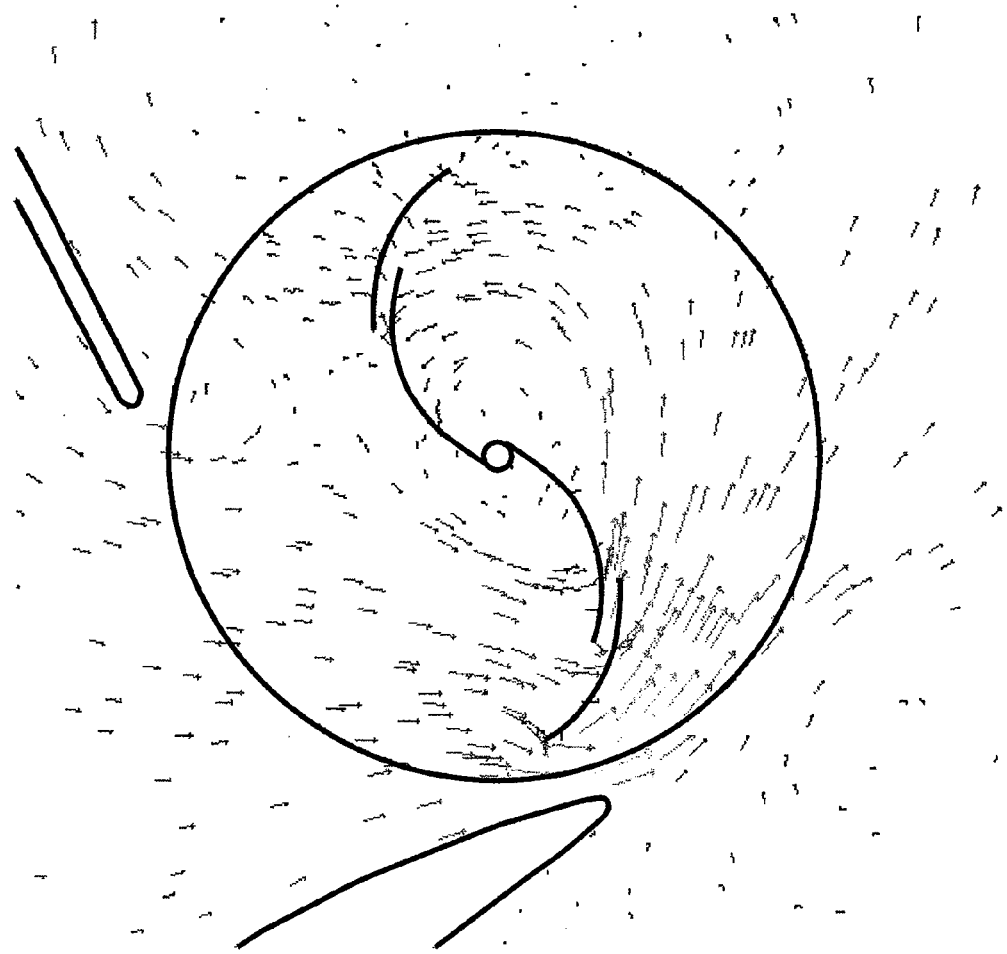
FIG. 23 is a wind velocity and directional flow diagram of the embodiment of FIG. 22A.

FIG. 23 is a wind velocity and directional flow diagram that illustrates the direction of flow of the wind and its intensity for the embodiment of FIG. 22A. FIG. 23 provides a good visual interpretation of the manner of operation of the embodiment illustrated in FIG. 22A.

Figure 24:
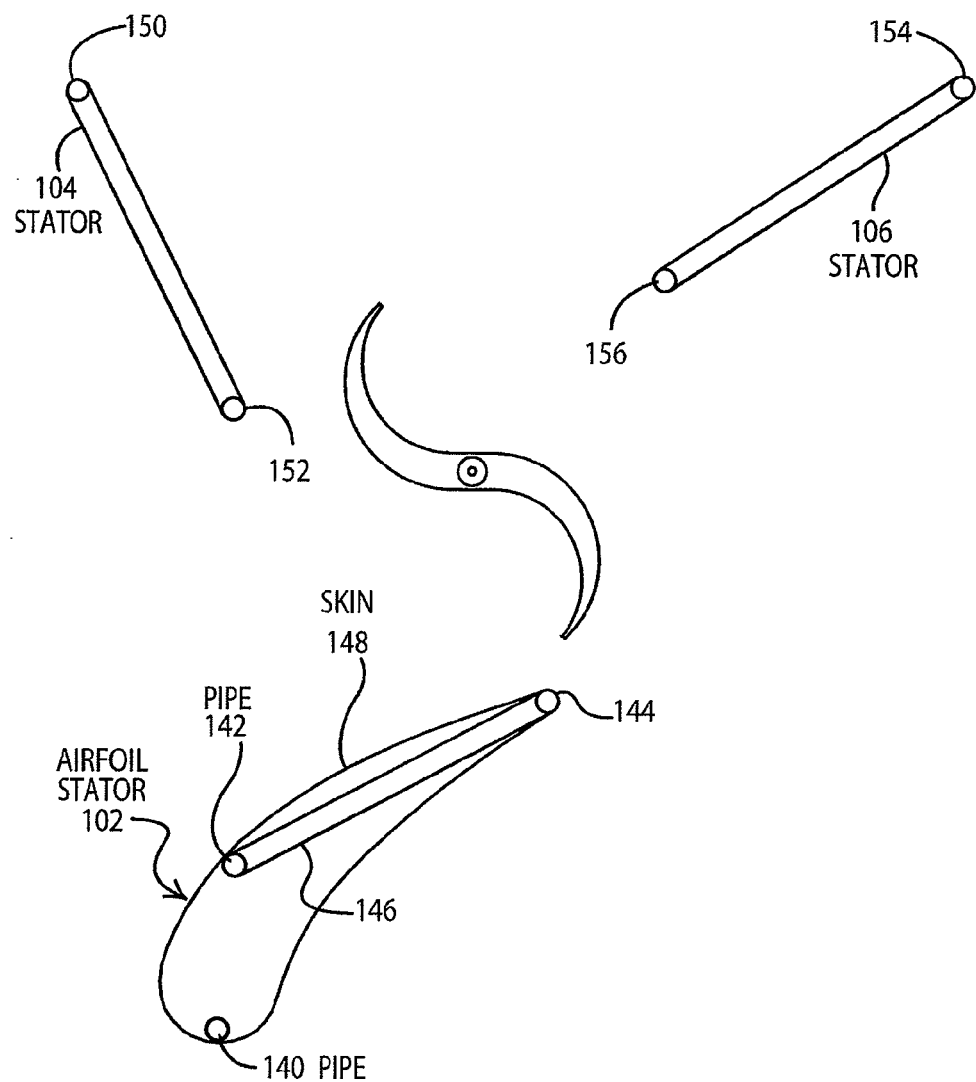
FIG. 24 is a schematic illustration of the manner in which the embodiment of FIG. 1A can be constructed.

FIG. 24 is a schematic illustration of the manner in which the embodiment of FIG. 1A can be constructed. Air foil stator 102 can be formed by using pipes 140, 142 and 144 to provide structural support. A braced framework 146 can be formed between pipe 142 and 144 to add further structural rigidity. The skin 148 of the air foil stator 102 can be formed from sheet metal, or any other desired material and can be laser cut to the desired shape shown in FIG. 24. Sheet metal having thicknesses of 14 gauge or 16 gauge, such as used in car fenders, can be employed to provide the desired shape. Other materials can also be used such as light weight laminates. Similarly, stator 104 can be formed by pipes 150 and 152 with standard braced framework that is covered with a sheet metal skin. Stator 106 can include pipes 154, 156 to form a structural member in the same manner as described above. Stators 102, 104, 106 may also be constructed from pre-cast concrete forms, or cast in place concrete forms, or any other construction technique known in the art.

Figure 25:
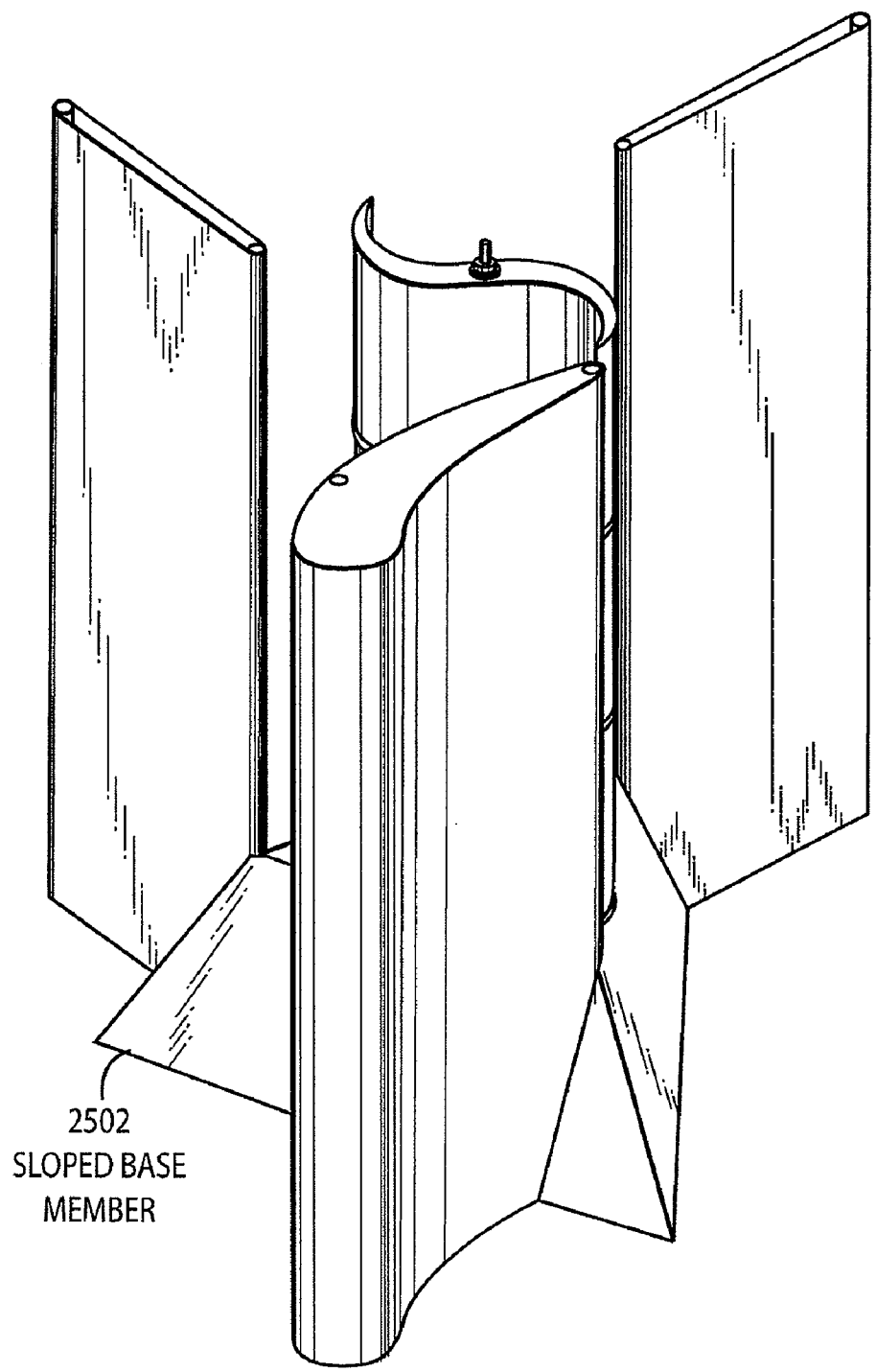
FIG. 25 is an isometric view of the embodiment of FIG. 1A.

FIG. 25 is an isometric view of the embodiment illustrated in FIG. 24 without a top lid. A low base member 2502 may be provided to direct ground winds into the device. This low base member is not a required element of the embodiment illustrated in FIG. 25 and can be replaced with simply a flat base plate.

Figure 26:
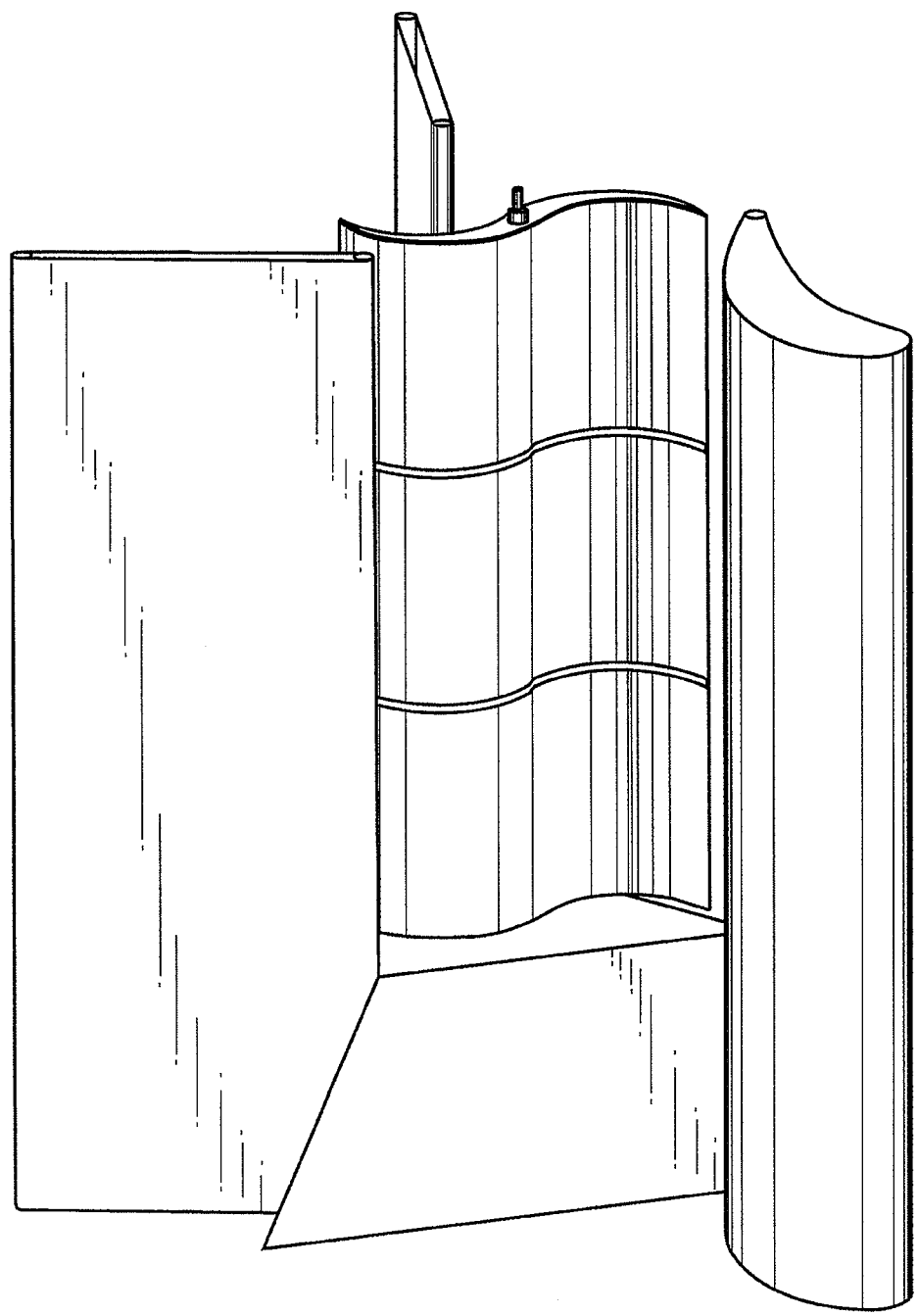
FIG. 26 is an isometric view of the embodiment of FIG. 1A viewed from a different orientation.

FIG. 26 is an isometric view of the embodiment of FIG. 25 that is viewed from a different direction. Again, the embodiment of FIG. 26 is shown without a top plate.

Figure 27:
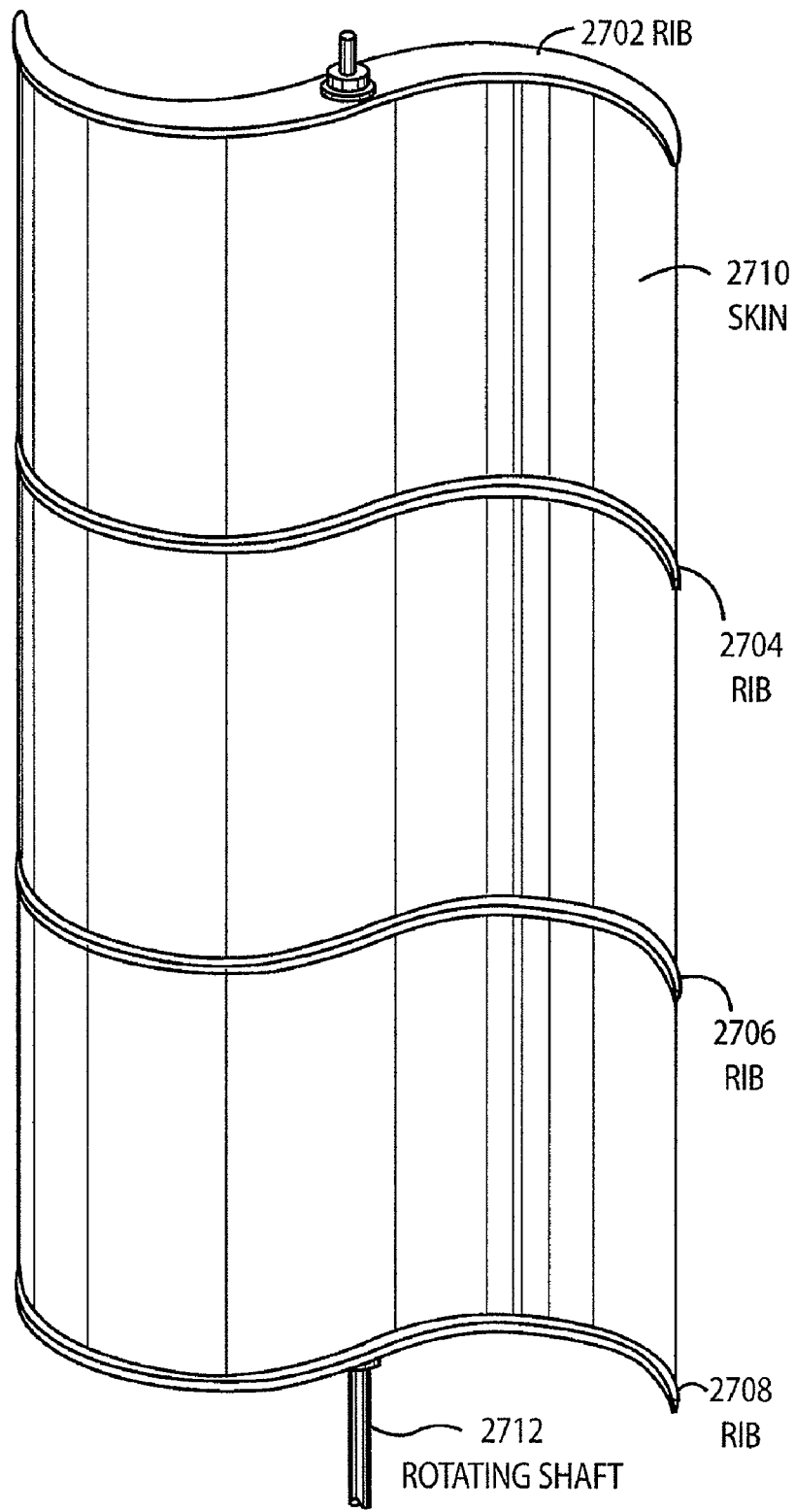
FIG. 27 is an isometric view of the rotor of the embodiment of FIG. 1A.

FIG. 27 is an isometric view of the manner in which the rotor blades can be constructed. As shown in FIG. 27, ribs 2702, 2704, 2706 and 2708 provide structural rigidity and the desired shape of each of the rotor blades. A braced framework (not shown) can be provided between each of the ribs 2702-2708. Skin 2710 is then applied to the surface of the braced framework to form the leading and trailing faces of the rotor blades. Rotating shaft 2712 is connected to each of the ribs 2702-2708 and to the skin 2710. The skin 2710 may be constructed from metal, aluminum, composites, or any other material known in the art.

Figure 28:
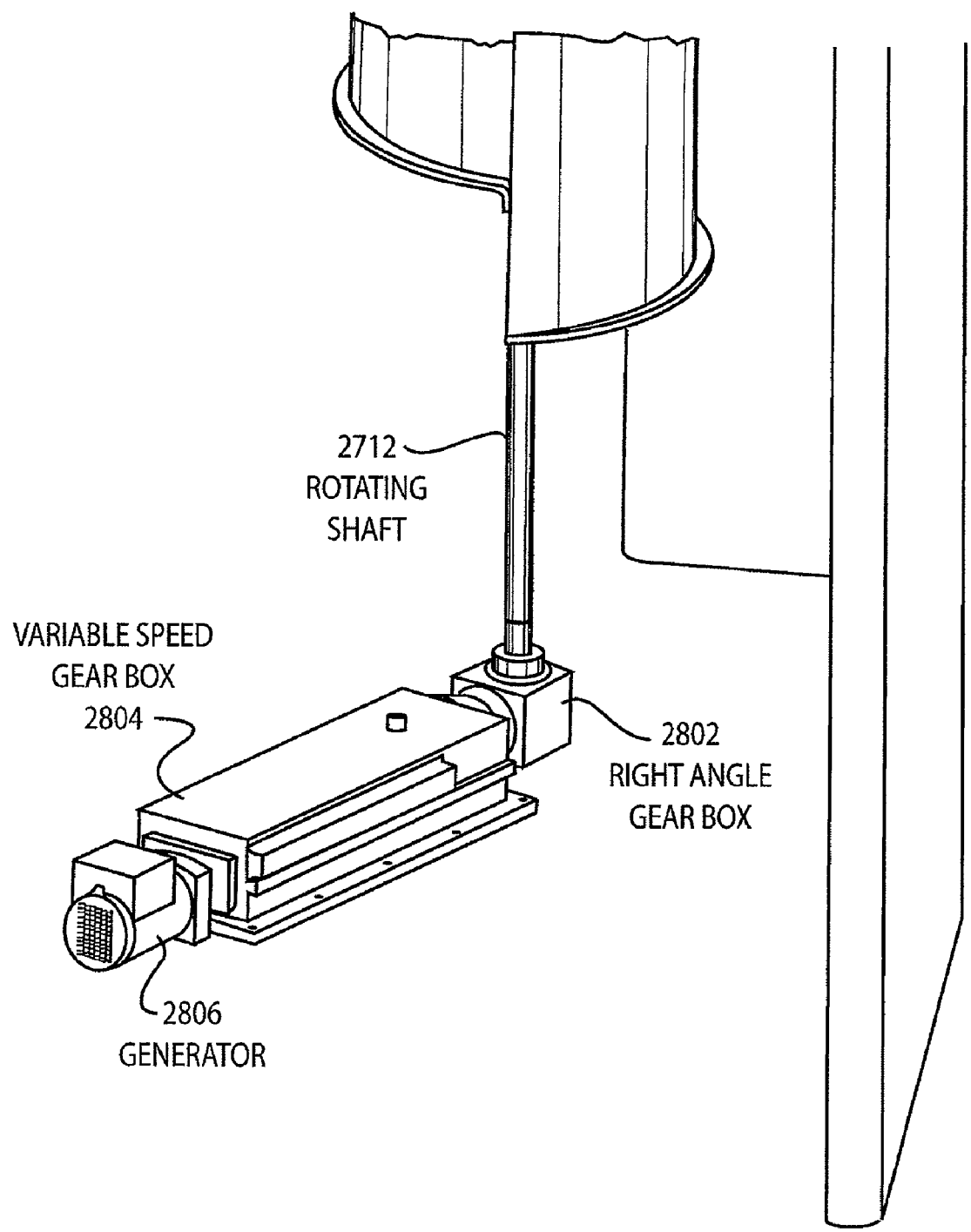
FIG. 28 is a schematic illustration that shows one manner of coupling the shaft of the rotor to a generator.

FIG. 28 is a schematic illustration of one embodiment of a power generation plant that can be used with any of the embodiments disclosed herein. As shown in FIG. 28, a rotating shaft 2712 is connected to a right-angle gear box 2702. Rotational energy is transferred in a horizontal direction to the variable speed gear box 2804. Generator 2806 then generates electrical energy from the mechanical energy of the variable speed gear box 2804.

Figure 29:
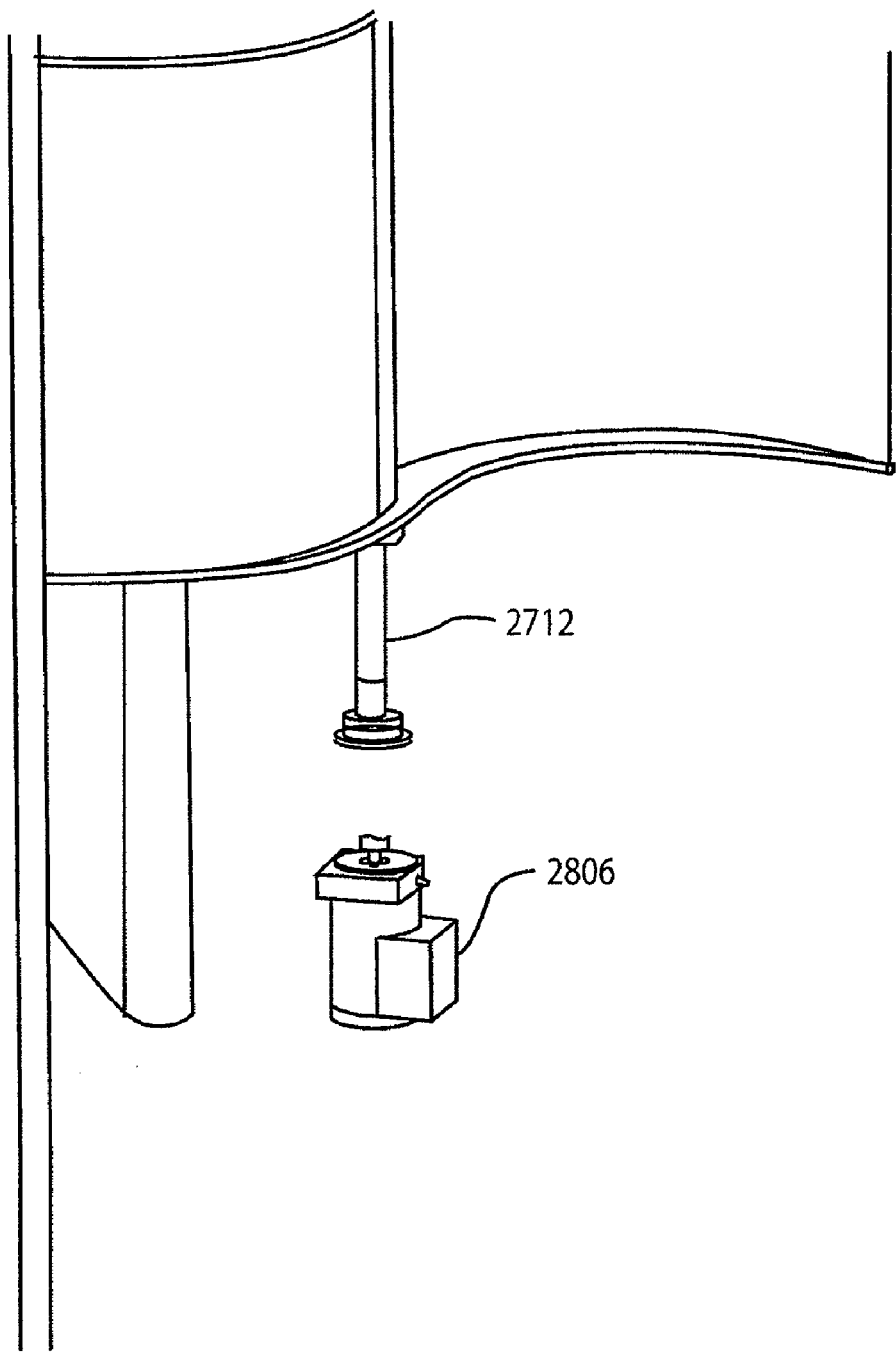
FIG. 29 is a schematic illustration that shows another manner of coupling the shaft to the generator.

FIG. 29 illustrates the manner in which the generator 2806 can be connected directly to the rotating shaft 2712. This direct connection in a vertical manner eliminates mechanical losses resulting from the right angle gear box 2802 and the variable speed gear box 2804. The rotating shaft 2712 may also be directly connected to a direct drive generator. This configuration eliminates any mechanical losses from the gearbox by eliminating the gearbox altogether. Various electrical techniques, known in the art, can be used to generate a 60-cycle signal that can be applied to the electrical grid.

The present invention therefore provides a cross-flow wind turbine that is capable of achieving high efficiencies and is operable in low-level, mid-level and high-level wind conditions. Because of the high efficiencies that can be achieved over a wide range of wind speeds, the overall efficiency of the embodiments disclosed herein are substantially greater than the overall efficiencies of axial-flow wind turbines.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of capturing wind energy using a cross-flow wind turbine comprising:

providing an airfoil stator that has at least one surface that has a portion that is curved;

generating a low pressure area on a leading face of a rotor blade by accelerating the flow of air across said curved surface of said airfoil stator that is positioned to form a predetermined gap between said rotor blade and said air foil stator during a power stroke of said rotor blade;

using a blocking stator to substantially block wind from impeding movement of said rotor blade during a return cycle of said rotor blade and directing said substantially blocked wind to a trailing face of said rotor during said power stroke of said rotor blade so as to create a pressure differential between said leading face and said trailing face of said rotor blade during said power stroke that creates a force that rotates said rotor blade.

2. A cross-flow wind turbine system that is capable of capturing wind energy comprising:

a rotor having at least two semicircular shaped rotor blades;

an airfoil stator having at least one surface that has a portion that is curved, said airfoil stator positioned to capture and accelerate wind across said curved surface of said airfoil stator and provide a gap having a predetermined size between said rotor blades and said curved surface so that a negative pressure area is formed on a leading face of said rotor blades as said rotor blades pass by said curved surface during a power stroke; and a blocking stator positioned to substantially block wind from impeding upon said leading face of said rotor blades during a return stroke and direct wind that is blocked by said blocking stator onto a trailing face of said rotor blades during said power stroke such that a pressure differential is created between said leading face of said rotor blades and said trailing face of said rotor blades during said power stroke that creates a force that rotates said rotor blade.

3. A cross-flow wind turbine that generates mechanical energy from wind comprising:

a rotor having a plurality of rotor blades that are substantially symmetrically disposed around a rotor;

a rotor space formed in a volume that is swept out by said rotor blades, said rotor space having a drive portion in which said rotor blades are driven by said wind and a return portion in which said rotor blades return to said drive portion;

a plurality of stators that direct wind into said drive portion and direct wind away from said return portion to cause said rotor to turn and generate said mechanical energy, said stators being placed around said rotor to provide a substantially bidirectional cross-flow turbine.

4. The cross-flow turbine of claim 3 wherein said rotor axis is vertical and said stators extend at least partially over a base so that said base and said stators capture wind along lower portions of said cross-flow turbine and direct winds from said lower portion of said cross-flow turbine.

5. A method of generating mechanical energy from wind comprising:

providing a cross-flow wind turbine having stators and a rotor that sweeps out a rotor space, said rotor space having a drive portion and a return portion;

placing a plurality of rotor blades substantially symmetrically around said rotor;

placing said stators around said rotor in locations that substantially direct said wind into said drive portion of said rotor space so that said wind drives said rotor blades in said drive portion, and substantially block said wind from entering said return portion of said rotor space so that said rotor blades return to said drive portion to generate said mechanical energy.

6. The method of claim 5 wherein said process of placing said stators around said rotor further comprises:

placing at least one stator in a position to block said wind from entering said return portion whenever said wind flows substantially from a first predetermined direction, and placing at least one other stator in a position to direct said wind into said drive portion whenever said wind is flowing substantially from said first predetermined direction.

7. The method of claim 5 wherein said process of placing said stators around said rotor, further comprises:

placing at least one stator in a position to block said wind from entering said return portion whenever said wind flows substantially from a first and a second predetermined direction, and placing at least one other stator in a position to direct said wind into said drive portion whenever said wind is flowing substantially from said first and said second predetermined direction.

8. The method of claim 5 wherein:

providing a cross-flow turbine comprises providing a vertical cross-flow turbine; and, placing said stators comprises placing said stators so that said stators at least partially extend over a base so that a utility enclosure and said stators direct wind from lower portions of said cross-flow turbine into said cross-flow turbine.

9. A method of capturing wind energy using a cross-flow wind turbine comprising:

providing an airfoil stator that is positioned to capture and accelerate wind across an airfoil surface of said airfoil stator;

generating a low pressure area on a leading face of a rotor blade by positioning said airfoil stator to form a predetermined gap between said rotor blade and said airfoil stator, said low pressure area generating a force on said leading face of said rotor blade that rotates said rotor blade in an efficient manner.

10. A cross-flow wind turbine system that is capable of capturing wind energy comprising:

a rotor having at least two semicircular shaped rotor blades;

an airfoil stator positioned to capture and accelerate wind across an airfoil surface of said airfoil stator and provide a gap having a predetermined size between said rotor blades and said airfoil surface so that a negative pressure area is formed on a leading face of said rotor blades as said rotor blades pass by said airfoil surface that creates a force that rotates said rotor blades.

* * * * *